(12) United States Patent
Fischer et al.

(10) Patent No.: US 11,447,682 B2
(45) Date of Patent: Sep. 20, 2022

(54) WATER-SOLUBLE OR WATER-SWELLABLE POLYMERS AS WATER LOSS REDUCERS IN CEMENT SLURRIES

(71) Applicant: Clariant International Ltd., Muttenz (CH)

(72) Inventors: Dirk Fischer, Hahnheim (DE);
Christoph Kayser, Mainz (DE);
Claudia Diemel, Gelnhausen (DE);
Jürgen Tonhauser, Oestrich-Winkel (DE); Michael Schäfer, Gründau-Rothenbergen (DE)

(73) Assignee: CLARIANT INTERNATIONAL LTD, Muttenz (CH)

( * ) Notice: Subject to any disclaimer, the term of this patent is extended or adjusted under 35 U.S.C. 154(b) by 0 days.

(21) Appl. No.: 15/931,339

(22) Filed: May 13, 2020

(65) Prior Publication Data
US 2020/0270506 A1 Aug. 27, 2020

Related U.S. Application Data

(62) Division of application No. 15/737,205, filed as application No. PCT/EP2016/062289 on May 31, 2016, now abandoned.

(30) Foreign Application Priority Data

Jun. 17, 2015 (EP) .................................... 15001797

(51) Int. Cl.
| | | |
|---|---|---|
| C09K 8/487 | (2006.01) | |
| C08F 220/56 | (2006.01) | |
| C08L 33/26 | (2006.01) | |
| C08L 3/02 | (2006.01) | |
| C08L 3/08 | (2006.01) | |
| C04B 28/02 | (2006.01) | |

(Continued)

(52) U.S. Cl.
CPC ............ *C09K 8/487* (2013.01); *C04B 24/165* (2013.01); *C04B 24/2688* (2013.01); *C04B 24/383* (2013.01); *C04B 28/02* (2013.01); *C04B 40/0042* (2013.01); *C08F 220/56* (2013.01); *C08L 3/02* (2013.01); *C08L 3/04* (2013.01); *C08L 3/08* (2013.01); *C08L 33/26* (2013.01); *C04B 2103/0051* (2013.01); *C04B 2103/0053* (2013.01); *C04B 2103/46* (2013.01); *C08F 2800/10* (2013.01)

(58) Field of Classification Search
CPC ... C09K 8/487; C04B 24/165; C04B 24/2688; C04B 24/383; C04B 28/02; C04B 40/0042; C04B 2103/0051; C04B 2103/0053; C04B 2103/46; C08F 220/56; C08F 2800/10; C08L 3/02; C08L 3/04; C08L 3/08; C08L 33/26

USPC ........................................................ 523/130
See application file for complete search history.

(56) References Cited

U.S. PATENT DOCUMENTS 2,614,989 A 10/1952 Hunter
2,809,971 A 10/1957 Bernstein
(Continued)

FOREIGN PATENT DOCUMENTS

CN 101066940 A 11/2007
CN 101636381 A 1/2010
(Continued)

OTHER PUBLICATIONS

Adhikary et al, Synthesis, characterization, and application of amylopectin-graft-poly(AM-co-AMPS), Journal of Applied Polymer Science (2012), 126(S1), 6 pages.
Anonymous, "Bio-based material—Wikipedia, the free encyclopedia", (Mar. 12, 2015), URL: https://en.wikipedia.org/wiki/Bio-based_material, (Sep. 1, 2016), XP055299147.
ASTM International, ASTM D6866-12, Standard Test Methods for Determining the Biobased Content of Solid, Liquid, and Gaseous Samples Using Radiocarbon Analysis (2012) (Year: 2012).
Babu, R. P. et al., "Current progress on bio-based polymers and their future trends", Progress in Biomaterials 2013, 2(8), 1-16. (Year: 2013).
Bernd Tieke, "Makromolekulare Chemie Chapter 3", ISBN 10:3527313796.
Bernd Tieke, "Makromolekulare Chemie: Eine Einführung", Wiley-VCH, 2. vollständig überarbeitete und erweiterte Auflage (3. Nachdruck 2010) ISBN-13: 978 3-527-31379-2, p. 259-261.
Bianca et al., "Fermentative production of isobutene", Appl Microbiol Biotechnol (2012) 93:1377-1387.
CTFA Cosmetic Ingredient Dictionary, Second Edition, 1977, 3 pages.
CTFA Cosmetic Ingredient Handbook, Second Edition, 1992, 2 pages.
De Jong et al, "Product developments in the bio-based chemicals arena", Biofuels, Bioprod. Bioref. 6:606-624 (2012).
Dräger-Röhrchen & CMS-Handbuch, 17. Auflage, Mar. 2015, 9 pages.
EP1351654B1—Google English Translation (Year: 2003), 19 pages.
(Continued)

*Primary Examiner* — David T Karst
(74) *Attorney, Agent, or Firm* — Tod A. Waldrop

(57) ABSTRACT

This invention relates to water-soluble or water-swellable polymers, containing a) 25-35 mol. % of one or more recurrent structural units of formula (1), where $R^1$ and $R^2$ represent hydrogen, methyl or ethyl, A represents a linear or branched $C_1$-$C_{12}$-alkylene, and $Q^+$ stands for $NH_4^+$, $Li^+$, $Na^+$, $K^+$, ½ $Ca^{++}$, ½ $Mg^{++}$, ½ $Zn^{++}$, ⅓ $Al^{+++}$, or organic ammonium ions of the formula $[HNR^5R^6R^7]^+$, b) 3 to 8 mol. % of one or more recurrent structural units of formula (2), where $R^1$ represents hydrogen, methyl, or ethyl, $X^+$ stands for $H^+$, $NH_4^+$, $Li^+$, $Na^+$, $K^+$, ½ $Ca^{++}$, ½ $Mg^{++}$, ½ $Zn^{++}$, ⅓ $Al^{+++}$, or organic ammonium ions of the formula $[HNR^5R^6R^7]^+$, B is a linear or branched alkylene group with 1 to 6 carbon atoms, and n is a whole number between 0 and 5, and c) 57 to 72 mol. % of a (meth)acrylamide.

18 Claims, No Drawings

(51) Int. Cl.
*C04B 24/16* (2006.01)
*C04B 24/26* (2006.01)
*C04B 24/38* (2006.01)
*C08L 3/04* (2006.01)
*C08L 3/00* (2006.01)
*C08F 220/06* (2006.01)
*C08F 220/58* (2006.01)
*C04B 40/00* (2006.01)
*C04B 103/00* (2006.01)
*C04B 103/46* (2006.01)

(56) References Cited

U.S. PATENT DOCUMENTS

| | | | |
|---|---|---|---|
| 2,865,876 A | | 12/1958 | Scott, Jr. |
| 2,904,580 A | | 9/1959 | Idol, Jr. |
| 2,905,565 A | | 9/1959 | Dietz |
| 3,052,628 A | | 9/1962 | Stanberry, Jr. |
| 3,236,733 A | | 2/1966 | Karsten |
| 3,509,113 A | | 4/1970 | Monagle |
| 3,544,597 A | | 12/1970 | Killam |
| 3,753,196 A | | 8/1973 | Kurtz |
| 3,761,418 A | | 9/1973 | Parran |
| 3,937,721 A | | 2/1976 | Schroeck |
| 3,960,918 A | | 6/1976 | Schroeck |
| 4,015,991 A | | 4/1977 | Persinski |
| 4,138,430 A | | 2/1979 | Stiles |
| 4,323,683 A | | 4/1982 | Bolich, Jr. |
| 4,342,653 A | | 8/1982 | Halverson |
| 4,345,080 A | | 8/1982 | Bolich, Jr. |
| 4,379,753 A | | 4/1983 | Bolich, Jr. |
| 4,470,982 A | | 9/1984 | Winkler |
| 4,487,864 A | | 12/1984 | Bermudez |
| 4,555,269 A | | 11/1985 | Rao |
| 4,655,943 A | | 4/1987 | Elmquist |
| 4,669,920 A | | 6/1987 | Dymond |
| 4,703,801 A | | 11/1987 | Fry |
| 4,722,958 A | * | 2/1988 | Sauer .................. A61Q 19/00 524/379 |
| 4,800,071 A | | 1/1989 | Kaesler |
| 4,931,489 A | | 6/1990 | Kucera |
| 5,025,040 A | | 6/1991 | Crema |
| 5,104,646 A | | 4/1992 | Bolich, Jr. |
| 5,194,639 A | | 3/1993 | Connor |
| 5,331,021 A | | 7/1994 | Ahmed |
| 5,472,051 A | | 12/1995 | Brothers |
| 5,510,049 A | | 4/1996 | Connor |
| 5,792,828 A | | 8/1998 | Quinn |
| 6,277,900 B1 | | 8/2001 | Oswald |
| 6,297,337 B1 | | 10/2001 | Marchant |
| 6,437,068 B2 | | 8/2002 | Loeffler |
| 6,683,144 B2 | | 1/2004 | Loeffler |
| 6,891,009 B2 | | 5/2005 | Loeffler |
| 7,208,556 B2 | | 4/2007 | Loeffler |
| 8,420,214 B2 | | 4/2013 | Kavanagh |
| 8,629,224 B2 | | 1/2014 | Loeffler |
| 9,399,692 B1 | | 7/2016 | Jiang |
| 9,434,793 B1 | | 9/2016 | Kane |
| 9,526,687 B2 | | 12/2016 | Klug |
| 9,611,419 B1 | | 4/2017 | Ferrell, Jr. |
| 9,834,635 B2 | | 12/2017 | Klug |
| 11,142,494 B2 | | 10/2021 | Kayser |
| 2003/0064044 A1 | | 4/2003 | Chen |
| 2004/0228809 A1 | | 11/2004 | Birkel |
| 2005/0003984 A1 | | 1/2005 | Himmrich |
| 2006/0019835 A1 | | 1/2006 | Kayser |
| 2007/0100102 A1 | * | 5/2007 | Fenchl .................. C08F 230/08 526/279 |
| 2008/0226577 A1 | | 9/2008 | L'Alloret |
| 2010/0048850 A1 | | 2/2010 | Dubois |
| 2010/0274048 A1 | | 10/2010 | Wakayama |
| 2010/0278763 A1 | | 11/2010 | Loeffler |
| 2010/0311904 A1 | | 12/2010 | Chambers |
| 2010/0331904 A1 | | 12/2010 | Warren |
| 2011/0110878 A1 | | 5/2011 | Knappe |
| 2011/0136718 A1 | | 6/2011 | Rodrigues |
| 2011/0318515 A1 | | 12/2011 | Dubois |
| 2012/0039819 A1 | | 2/2012 | Nakatani |
| 2012/0100084 A1 | | 4/2012 | Peter |
| 2012/0138299 A1 | * | 6/2012 | Joseph .................. C04B 28/06 166/293 |
| 2013/0043384 A1 | | 2/2013 | Matsumoto |
| 2013/0129652 A1 | | 5/2013 | Blin |
| 2014/0051819 A1 | | 2/2014 | Davidson |
| 2014/0086854 A1 | | 3/2014 | Klug |
| 2014/0127147 A1 | | 5/2014 | Klug |
| 2014/0128513 A1 | * | 5/2014 | Carlson .................. C08L 1/08 524/5 |
| 2014/0154758 A1 | | 6/2014 | Dubois |
| 2014/0256880 A1 | | 9/2014 | Rodrigues |
| 2015/0239803 A1 | | 8/2015 | Sun |
| 2015/0329877 A1 | | 11/2015 | Bockrath |
| 2016/0177002 A1 | | 6/2016 | Palchik |
| 2016/0185948 A1 | | 6/2016 | Kaneumi |
| 2016/0190641 A1 | | 6/2016 | Lee |
| 2016/0194416 A1 | | 7/2016 | Fukuhara |
| 2016/0194423 A1 | | 7/2016 | Michitaka |
| 2016/0200670 A1 | | 7/2016 | Reb |
| 2016/0200952 A1 | | 7/2016 | Takahara |
| 2016/0211521 A1 | | 7/2016 | Iwayasu |
| 2016/0214896 A1 | | 7/2016 | Cadix |
| 2016/0222580 A1 | | 8/2016 | Shimada |
| 2016/0236982 A1 | | 8/2016 | Menceloglu |
| 2016/0244594 A1 | | 8/2016 | Langlotz |
| 2016/0244629 A1 | | 8/2016 | Xu |
| 2016/0271988 A1 | | 9/2016 | Oharuda |
| 2016/0272676 A1 | | 9/2016 | Kozlov |
| 2016/0288045 A1 | | 10/2016 | Kramer |
| 2016/0298110 A1 | | 10/2016 | McGall |
| 2016/0333199 A1 | | 11/2016 | Akkerman |
| 2016/0333215 A1 | | 11/2016 | Kawai |
| 2016/0340456 A1 | | 11/2016 | Mori |
| 2016/0340540 A1 | | 11/2016 | Brust |
| 2016/0340541 A1 | | 11/2016 | Lele |
| 2016/0340617 A1 | | 11/2016 | Orizet |
| 2016/0346188 A1 | | 12/2016 | Singh |
| 2016/0346395 A1 | | 12/2016 | Reineke |
| 2016/0354771 A1 | | 12/2016 | Inomata |
| 2016/0355624 A1 | | 12/2016 | Chen |
| 2016/0355735 A1 | | 12/2016 | Motooka |
| 2016/0355736 A1 | | 12/2016 | Motooka |
| 2016/0359156 A1 | | 12/2016 | Ohkubo |
| 2016/0367468 A1 | | 12/2016 | Graham |
| 2016/0369025 A1 | | 12/2016 | Yukawa |
| 2017/0001188 A1 | | 1/2017 | Choi |
| 2017/0001382 A1 | | 1/2017 | Stepper |
| 2017/0002152 A1 | | 1/2017 | Fonnum |
| 2017/0009111 A1 | | 1/2017 | Bauer |
| 2017/0015693 A1 | | 1/2017 | Carlson |
| 2017/0022451 A1 | | 1/2017 | Tamareselvy |
| 2017/0029305 A1 | | 2/2017 | Gill |
| 2017/0029548 A1 | | 2/2017 | Kawai |
| 2017/0030015 A1 | | 2/2017 | Amin |
| 2017/0031243 A1 | | 2/2017 | Hatakeyama |
| 2017/0037170 A1 | | 2/2017 | Gonzalez |
| 2017/0037206 A1 | | 2/2017 | Antheunis |
| 2017/0037286 A1 | | 2/2017 | Lee |
| 2017/0038500 A1 | | 2/2017 | Benz |
| 2017/0044287 A1 | | 2/2017 | Yahagi |
| 2017/0045819 A1 | | 2/2017 | Karasawa |
| 2017/0059990 A1 | | 3/2017 | Tsuchimura |
| 2017/0073446 A1 | | 3/2017 | Corten |
| 2017/0106013 A1 | | 4/2017 | Piergallini |
| 2017/0121567 A1 | | 5/2017 | Kawasaki |
| 2017/0123106 A1 | | 5/2017 | Chien |
| 2017/0123229 A1 | | 5/2017 | Chien |
| 2017/0129812 A1 | | 5/2017 | Langlotz |
| 2017/0130076 A1 | | 5/2017 | Most |
| 2017/0135941 A1 | | 5/2017 | Green |
| 2017/0145244 A1 | | 5/2017 | Yang |
| 2017/0158951 A1 | | 6/2017 | Liang |
| 2017/0166776 A1 | | 6/2017 | Derocher |
| 2017/0174901 A1 | | 6/2017 | Okumura |
| 2017/0174905 A1 | | 6/2017 | Bohling |

(56) References Cited

U.S. PATENT DOCUMENTS

| | | |
|---|---|---|
| 2017/0175335 A1 | 6/2017 | Daniels |
| 2017/0198189 A1 | 7/2017 | Panamarathupalayam |
| 2017/0210864 A1 | 7/2017 | Zhao |
| 2017/0210937 A1 | 7/2017 | Okazaki |
| 2017/0214047 A1 | 7/2017 | Naito |
| 2017/0225404 A1 | 8/2017 | Naruse |
| 2017/0226050 A1 | 8/2017 | Voronov |
| 2017/0240799 A1 | 8/2017 | Wei |
| 2017/0242174 A1 | 8/2017 | Ito |
| 2017/0244095 A1 | 8/2017 | Sonobe |
| 2017/0247487 A1 | 8/2017 | Hemmi |
| 2017/0247489 A1 | 8/2017 | Tekobo |
| 2017/0253683 A1 | 9/2017 | Fujiwara |
| 2017/0275408 A1 | 9/2017 | Yang |
| 2017/0275447 A1 | 9/2017 | Junk |
| 2017/0275813 A1 | 9/2017 | Isobe |
| 2017/0283537 A1 | 10/2017 | Hatton |
| 2017/0291971 A1 | 10/2017 | Serrano |
| 2017/0298155 A1 | 10/2017 | Takafuji |
| 2017/0299779 A1 | 10/2017 | Mita |
| 2017/0305855 A1 | 10/2017 | Klun |
| 2017/0306060 A1 | 10/2017 | Fujita |
| 2017/0306195 A1 | 10/2017 | Lachapell |
| 2017/0313801 A1 | 11/2017 | Takeo |
| 2017/0320985 A1 | 11/2017 | Al-Ghamdi |
| 2017/0321050 A1 | 11/2017 | Elanany |
| 2017/0327679 A1 | 11/2017 | Ghosh |
| 2017/0334778 A1 | 11/2017 | Vilinska |
| 2017/0342220 A1 | 11/2017 | Iijima |
| 2017/0348219 A1 | 12/2017 | Uyama |
| 2017/0349679 A1 | 12/2017 | Yashiki |
| 2017/0355873 A1 | 12/2017 | Wu |
| 2017/0361297 A1 | 12/2017 | Yamanaka |
| 2017/0363956 A1 | 12/2017 | Mizuguchi |
| 2017/0369697 A1 | 12/2017 | Yahagi |
| 2017/0369698 A1 | 12/2017 | Suzuki |
| 2018/0002553 A1 | 1/2018 | Harada |
| 2018/0002563 A1 | 1/2018 | Taylor |
| 2018/0008936 A1 | 1/2018 | Martinez |
| 2018/0016739 A1 | 1/2018 | Coppens |
| 2018/0036689 A1 | 2/2018 | Inoue |
| 2018/0037753 A1 | 2/2018 | Dombrowski |
| 2018/0052152 A1 | 2/2018 | Sacha |
| 2018/0057629 A1 | 3/2018 | Letondor |
| 2018/0072932 A1 | 3/2018 | Kaneko |
| 2018/0079158 A1 | 3/2018 | Qiu |
| 2018/0080119 A1 | 3/2018 | Strand |
| 2018/0086936 A1 | 3/2018 | Steiner |
| 2018/0086966 A1 | 3/2018 | Favero |
| 2018/0093113 A1 | 4/2018 | Schade |
| 2018/0111900 A1 | 4/2018 | Miller |
| 2018/0118970 A1 | 5/2018 | Kaur |
| 2018/0118978 A1 | 5/2018 | Yabu |
| 2018/0133662 A1 | 5/2018 | Kang |
| 2018/0133986 A1 | 5/2018 | Harada |
| 2018/0148578 A1 | 5/2018 | Ohta |
| 2018/0148635 A1 | 5/2018 | Shen |
| 2018/0155478 A1 | 6/2018 | Kayser |
| 2018/0163078 A1 | 6/2018 | Sukhishvili |
| 2018/0169296 A1 | 6/2018 | Benz |
| 2018/0171051 A1 | 6/2018 | Junk |
| 2018/0171203 A1 | 6/2018 | Cadix |
| 2018/0171207 A1 | 6/2018 | Fischer |
| 2018/0171208 A1 | 6/2018 | Fischer |
| 2018/0179412 A1 | 6/2018 | Bitler |
| 2018/0186993 A1 | 7/2018 | Tanida |
| 2018/0194882 A1 | 7/2018 | Chambrol |
| 2018/0194948 A1 | 7/2018 | Fan |
| 2018/0194969 A1 | 7/2018 | An |
| 2018/0201713 A1 | 7/2018 | Iwasaki |
| 2018/0206484 A1 | 7/2018 | Bittner |
| 2018/0215925 A1 | 8/2018 | Hatanaka |
| 2018/0217294 A1 | 8/2018 | Hyuugaji |
| 2018/0229023 A1 | 8/2018 | Hatakeyama |
| 2018/0229024 A1 | 8/2018 | Hatakeyama |
| 2018/0230256 A1 | 8/2018 | Yamamuro |
| 2018/0237561 A1 | 8/2018 | Hatakeyama |
| 2018/0237567 A1 | 8/2018 | Klee |
| 2018/0240564 A1 | 8/2018 | Hatakeyama |
| 2018/0244609 A1 | 8/2018 | Favero |
| 2018/0244911 A1 | 8/2018 | Iso |
| 2018/0258297 A1 | 9/2018 | Kitou |
| 2018/0273743 A1 | 9/2018 | Sumerlin |
| 2018/0273761 A1 | 9/2018 | Yoshimura |
| 2018/0273774 A1 | 9/2018 | Brown |
| 2018/0290377 A1 | 10/2018 | Talken |
| 2018/0291219 A1 | 10/2018 | Kiyosada |
| 2018/0312739 A1 | 11/2018 | Panamarathupalayam |
| 2018/0321589 A1 | 11/2018 | Tsuchimura |
| 2018/0325789 A1 | 11/2018 | Takemoto |
| 2018/0327585 A1 | 11/2018 | Adkins |
| 2018/0340098 A1 | 11/2018 | Tanabe |
| 2018/0344615 A1 | 12/2018 | Gamez-Garcia |
| 2018/0346626 A1 | 12/2018 | Ying |
| 2018/0346634 A1 | 12/2018 | Rodriguez-Emmenegger |
| 2018/0346804 A1 | 12/2018 | Blazewicz |
| 2018/0348405 A1 | 12/2018 | Chien |
| 2018/0351149 A1 | 12/2018 | Akiike |
| 2018/0353650 A1 | 12/2018 | Bose |
| 2018/0356561 A1 | 12/2018 | Hyugaji |
| 2018/0362689 A1 | 12/2018 | Jimenez Garcia |
| 2018/0362833 A1 | 12/2018 | Jackson |
| 2019/0058195 A1 | 2/2019 | Hanasaki |
| 2019/0202737 A1 | 7/2019 | Hesselbarth |
| 2019/0241509 A1 | 8/2019 | Kayser |
| 2019/0338060 A1 | 11/2019 | Fischer |
| 2019/0359735 A1 | 11/2019 | Fischer |
| 2020/0009041 A1 | 1/2020 | Fischer |
| 2020/0010598 A1 | 1/2020 | Fischer |
| 2020/0017618 A1 | 1/2020 | Fischer |
| 2020/0017619 A1 | 1/2020 | Fischer |
| 2020/0078287 A1 | 3/2020 | Fischer |
| 2020/0095356 A1 | 3/2020 | Fischer |
| 2020/0270506 A1 | 8/2020 | Fischer |

FOREIGN PATENT DOCUMENTS

| | | |
|---|---|---|
| CN | 102351744 A | 2/2012 |
| CN | 102361894 A | 2/2012 |
| CN | 102952044 A | 3/2013 |
| CN | 103492437 A | 1/2014 |
| CN | 103819614 | 5/2014 |
| CN | 104204080 A | 12/2014 |
| CN | 104884628 A | 9/2015 |
| CN | 105694403 A | 6/2016 |
| DE | 2655891 | 6/1977 |
| EP | 0116671 | 8/1984 |
| EP | 0157055 | 10/1985 |
| EP | 0217608 | 4/1987 |
| EP | 0244981 | 11/1987 |
| EP | 0550637 | 7/1993 |
| EP | 0750899 | 1/1997 |
| EP | 0816403 | 1/1998 |
| EP | 1045869 | 10/2000 |
| EP | 1084696 | 3/2001 |
| EP | 1351654 A1 | 10/2003 |
| EP | 2105127 | 9/2009 |
| EP | 2166060 | 3/2010 |
| JP | 2008084852 A | 4/2008 |
| JP | 2009149536 A | 7/2009 |
| JP | 2010519191 A | 6/2010 |
| JP | 2011506703 A | 3/2011 |
| JP | 2012087256 A | 5/2012 |
| JP | 2012521448 A | 9/2012 |
| JP | 2014500334 | 1/2014 |
| JP | 2014055232 A | 3/2014 |
| JP | 2014511423 A | 5/2014 |
| WO | 9206154 | 4/1992 |
| WO | 9507340 | 3/1995 |
| WO | 9800094 | 1/1998 |
| WO | 9924549 | 5/1999 |
| WO | 9926991 | 6/1999 |
| WO | 9966017 | 12/1999 |
| WO | 0226925 | 4/2002 |

(56) References Cited

FOREIGN PATENT DOCUMENTS

| | | | |
|---|---|---|---|
| WO | 2009063120 A1 | 5/2009 | |
| WO | 2009072480 A | 6/2009 | |
| WO | 2010092875 A1 | 8/2010 | |
| WO | 2011089709 | 7/2011 | |
| WO | 2012084977 A1 | 6/2012 | |
| WO | 2012113671 | 8/2012 | |
| WO | 2013017262 | 2/2013 | |
| WO | 2013113938 A1 | 8/2013 | |
| WO | WO-2013120636 A1 * | 8/2013 | ............... C09K 8/12 |
| WO | 2013178668 | 12/2013 | |
| WO | 2013178700 | 12/2013 | |
| WO | 2014004616 | 1/2014 | |
| WO | 2014086780 | 6/2014 | |
| WO | 2014088034 | 6/2014 | |
| WO | 2015034948 | 3/2015 | |
| WO | 2016042011 | 3/2016 | |
| WO | 2017220512 | 12/2017 | |

OTHER PUBLICATIONS

George Odian, "Principles of Polymerization", Third Edition, Wiley-Interscience, New York, in chapter 1-4, p. 19 to 24, ISBN 0-471-61020-8, Aug. 1992.

International Cosmetic Ingredient Dictionary, Fifth Edition, 1993.

International Preliminary Report on Patentability for PCT/EP2017/064977, dated Dec. 25, 2018, 7 pages.

International Search Report for App. No. PCT/EP2017/081415, dated Jan. 16, 2018, 3 pages.

International Search Report for App. No. PCT/EP2017/081417, dated Apr. 4, 2018, 2 pages.

International Search Report for App. No. PCT/EP2017/081667, dated Jan. 23, 2018, 3 pages.

International Search Report for App. No. PCT/EP2017/081681, dated Apr. 11, 2018, 3 pages.

International Search Report for PCT/EP2017/06477, dated Aug. 29, 2017, 2 pages.

International Search Report for PCT/EP2017/081665, dated Jan. 23, 2018, 2 pages.

International Search Report for PCT/EP2017/081666, dated Jan. 23, 2018, 2 pages.

Kourosh Kabiri et al: "Chitosan-modified nanoclay-poly(AMPS) nanocomposite hydrogels with improved gel strength", Polymer International, vol. 58, No. 11, Sep. 10, 2009 (Sep. 10, 2009), pp. 1252-1259, XP055379190.

Le Notre et al, Green Chemistry, Biobased synthesis of acrylonitrile from glutamic acid, 2011, 13, pp. 807-809, (Year: 2011).

M. A. Bañares, M. O. Guerrero-Pérez, "Appl. Catal. B: Environmental", 148-149 (2013) 601-603.

M. O. Guerrero-Pérez, M. A. Bañares, "New Reaction: Conversion of Glycerol into Acrylonitrile", ChemSusChem 1 (2008) 511-513.

M. O. Guerrero-Péreza and M. A. Bañares, "Metrics of acrylonitrile: From biomass vs. petrochemical route", Catalysis Today 239 (2015) 25-30.

Machine Translation of Aoi Keigo, et al, Bio-based Polymers Seni Gakkaishi, 2010, vol. 66 No. 4, p. 124-128.

Machine Translation of Netsu Sokutei, 2012, 39(4), p. 143-150.

Masao Kunioka, "Measurement Methods of Biobased Carbon Content for Biomass-Based Chemicals and Plastics", Radioisotopes, 62, 901-925 (2013).

Mithilesh Yadav et al: "Superabsorbent nanocomposite (alginate-g-PAMPS/MMT): Synthesis, characterization and swelling behavior", Carbohydrate Polymers, Applied Science Publishers, Ltd. Barking, GB, vol. 90, No. 1, May 4, 2012 (May 4, 2012), pp. 165-173, XP028432003.

Pourjavadi et al, "Modified Carrageenan. 4. Synthesis and Swelling Behavior of Crosslinked KC-g-AMPS Superabsorbent Hydrogel with Antisalt and pH-Responsiveness Properties", Journal of Applied Polymer Science, vol. 98, 255-263 (2005).

Rana, V. et al, "Carbohydrate Polymers", 83 (2011) 1031-1047.

Renae Canterbery Pepe et al., International Cosmetic Ingredient Dictionary and Handbook, 9th Edition, 2002, vol. 4, Published by The Cosmetic, Toiletry, and Fragrance Association, 3 pages.

Srivastava et al, "Graft copolymerization of 2-Acrylamideo-2-methyl-1-propane sulphonic acid onto xanthan gum by ascorbic/bromate redox pair," PMSE Preprints (2004), 90, pp. 291-292.

Srivastava et al, Modification of natural polymer via free radical graft copolymerization of 2 acrylamideo-2-methyl-1-propane sulfonic acid in aqueous media and study of swelling and metal ion sorption behaviour, Journal of Applied Polymer Science (2009), 114(3), 1426-1434.

Le Notre et al., "Supporting Information, Biobased synthesis of acrylonitrile from glutamic acid", Green Chemistry, 2011, 13(4), pp. 807-809.

Tateo, F. et al. "Determination of gamma-butyrolactone (GBL) in foods by SBSE-TD/GC/MS". Journal of Food Composition and Analysis 2003, 16, 721-727. (Year: 2003).

Teodorescu, M. et al. "Poly(vinylpyrrolidone)—A Versatile Polymer for Biomedical and Beyond Medical Applications". Polymer-Plastics Technology and Engineering 2015, 54(9), pp. 923-943.

Zhang, Q. et al. "Enhancing the Acetylene Yield from Methane by Decoupling Oxidation and Pyrolysis Reactions: A Comparison with the Partial Oxidation Process". Industrial & Engineering Chemistry Research 2016, 55, 8383-8394 (Year: 2016).

\* cited by examiner

WATER-SOLUBLE OR WATER-SWELLABLE POLYMERS AS WATER LOSS REDUCERS IN CEMENT SLURRIES

The present invention relates to water-soluble or water-swellable polymers based on acryl-, methacryl- or ethacrylamidoalkylsulfonic acid or salts thereof and carboxyalkyl acrylate, methacrylate or ethacrylate or oligomers of these carboxyl compounds, and acrylamides or alkylacrylamides, to a process for preparing these polymers and to the use thereof as water loss reducers in cement slurries for cementing deep wells for reducing the water loss at the wellbore wall (fluid loss additives).

In deep wells for developing mineral oil and natural gas deposits, the use of cement slurries has long been known. Once the wellbore has reached a certain depth, what are called feed tubes are introduced into the wellbore. For this purpose, the feed tubes have to be fixed, meaning that a cement slurry is pumped into the cavity between the rock and the feed tubes and hardens to give a solid rock. The cement rock which forms has to be impermeable to gases and liquids, in order that no gas and/or oil can flow out of the reservoir rock into other sections or up to the surface. High demands are made on the cement slurry to be pumped. It should have good pumpability, i.e. minimum viscosity, and nevertheless not exhibit any separation. The release of water from the cement slurry to the porous rock during the pumping operation should be low, in order that no thick filtercakes form at the wellbore wall, which would increase the pump pressure because of the annular space constriction to such a high degree that the porous rock breaks up. Moreover, the cement slurry, in the case of excessive water release, would not set optimally and would become permeable to gas and oil. On the other hand, the cement shell which forms in the annular space must attain sufficient strength very quickly, and no shrinkage, which leads to flow channels for gas, oil and water, may occur in the course of setting. Optimal adjustment of the properties of the cement slurry is possible only by means of additives. The most important additives are retardants, accelerators, dispersants and water loss reducers.

Effective water loss reducers used in practice for cement and gypsum slurries are a wide variety of different polymers, copolymers and combinations thereof. The first effective products, which are still being used even now, were cellulose ethers based on hydroxyethyl cellulose and carboxymethyl hydroxyethyl cellulose. Owing to thermal instability, these lose efficiency at wellbore temperatures above 100° C. (212° F.). If the temperature rises to about 120° C. to 150° C., thermal breakdown of these biogenic substances commences. As a result, many different fully synthetic thermally stabilized polymers have been developed and are still being used nowadays at the different temperatures and salinities of the cement slurry.

Polymers as additives for reducing the water loss from cement slurries are well known in the literature, although many have very limited activity in the temperature range between 30° C. (86° F.) and 200° C. (392° F.).

U.S. Pat. No. 2,614,998 describes the use of partly hydrolyzed polyacrylamide (polyacrylamide-co-acrylic acid) as water loss-reducing polymer. However, these polymers can lead to significant delays in the setting time of the cement and show only low efficacy at high temperatures.

U.S. Pat. Nos. 2,865,876, 2,905,565 and 3,052,628 describe the use of sulfonated polymers as additives. The polymers and copolymers described therein differ distinctly in terms of composition from the copolymers of the invention and have gained no technical significance at all.

U.S. Pat. No. 5,472,051 describes copolymers of acryloyldimethyltaurate and acrylic acid having molecular weights of less than 5000 g/mol. However, these polymers can lead to severe delays in the setting time of the cement and, because of the molecular weight, show high water losses at high temperatures.

WO-99026991 and EP-1045869 teach copolymers of acryloyldimethyltaurate and acrylamide, but these polymers, in direct comparison with the copolymers of the invention, exhibit poorer performance properties below a temperature of 50° C. (122° F.) (comparative example 1).

U.S. Pat. No. 4,015,991 describes a polymer prepared by polymerization of acryloyldimethyltaurate and acrylamide in water, wherein at least 20% of the acrylamide units have to be hydrolyzed subsequently to acrylic acid or a salt of acrylic acid. The copolymer described in the examples of U.S. Pat. No. 4,015,991 has formed through the polymerization of 116.4 g (0.56 mol) of acryloyldimethyltaurate and 14.7 g (0.207 mol) of acrylamide in water. After at least 20% of the acrylamide units have been hydrolyzed to acrylic acid, U.S. Pat. No. 4,015,991 claims the following copolymer:

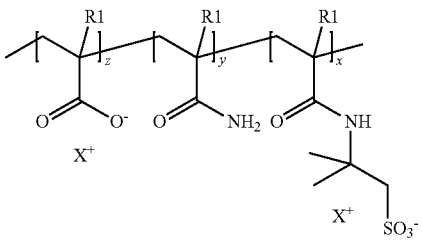

where
x is 73.8 mol %
y is max. 21.8 mol %
z is at least 4.4 mol %, depending on y.

However, the disadvantage of this polymer is an unwanted influence on the cement properties (reduction in hardened cement strength) and the delaying effect on the solidification of the cement. A further problem is the restricted temperature range for use as a water loss-reducing polymer. At 176.7° C. (350° F.), it is demonstrably inactive (comparative examples 5 and 6). U.S. Pat. No. 4,015,991 showed that it is not possible by aqueous polymerization of acryloyldimethyltaurate and acrylamide without a hydrolysis step to produce any copolymer suitable for application purposes.

EP-0116671 discloses the introduction of 5%-60% by weight of vinylamides (e.g. N-vinylmethylacetamide) into acryloyldimethyltaurate-containing polymers. In this way, the high-temperature range of the application was significantly extended. However, these polymers have poorer performance properties at temperatures below a temperature of 50° C. (122° F.).

U.S. Pat. No. 5,025,040 describes copolymers of acryloyldimethyltaurate, acrylamide and at least 20% N-vinylimidazole.

U.S. Pat. No. 4,931,489 discloses copolymers of substituted acrylamides and N-vinylimidazoles, without the use of acryloyldimethyltaurate.

EP-0217608, U.S. Pat. No. 4,555,269 and EP-0157055 describe a copolymer of acryloyldimethyltaurate and dimethylacrylamide in a molar ratio of 1:4 to 4:1 as a fluid loss additive for salt-containing (about 10% by weight) cement slurries and the use of acryloyldimethyltaurate and acrylic acid in a molar ratio of 1:4 to 4:1 for the same purpose.

Polymers based on acryloyldimethyltaurate or salts thereof are already known. No solution satisfactory for application purposes for a temperature range between 30° C. (86° F.) and 200° C. (392° F.) on the basis of the monomers disclosed in U.S. Pat. No. 4,015,991 has been described to date.

Polymers based on acryloyldimethyltaurate, acrylic acid and acrylamide are likewise known:

EP-0244981 discloses polymers based on acryloyldimethyltaurate, acrylic acid and acrylamide as a soil-repellent sealing formulation. These polymers are prepared by the free-radical polymerization of the monomers in an aqueous medium. Polymers prepared according to examples 1-8 in EP-0244981, because of their polymer architecture (comparative examples 2, 3 and 4), demonstrably do not bring about any reduction in water loss when they are used as additive in cement slurries.

Polymers based on sulfonates and acrylamide, according to U.S. Pat. No. 4,800,071, are employed as filtration aids in order to remove sparingly soluble calcium salts from aqueous phosphoric acid solutions. No use of these polymers as water loss reducers in cement slurries for cementing deep wells has been disclosed.

U.S. Pat. No. 4,342,653 discloses polymers based on acryloyldimethyltaurate and acrylamide.

These polymers are used as precipitation aids for aqueous dispersions. The precipitation aids described should have between 1 and 35 mol % of repeat units of acryloyldimethyltaurate, and a Brookfield viscosity of at least $2 \cdot 10^{-3}$ Pa·s. The example adduced in U.S. Pat. No. 4,342,653 features an acrylamide content of 94 mol %. Such a high molar acrylamide content does not lead to any reduction in water loss in cement slurries.

JP-11310751 describes polymers based on 10-90 mol % of acryloyldimethyltaurate, 0-90 mol % of acrylamide and 0-30 mol % of further copolymerizable monomers suitable for paper coatings, adhesives and emulsion-based adhesives. These polymers are prepared by the free-radical polymerization of the monomers in an aqueous medium. Polymers prepared by the process in JP-11310751, because of their polymer architecture, do not bring about any reduction in water loss when they are used as additive in cement slurries.

JP-63060240 discloses polymers based on acryloyldimethyltaurate, acrylamides and sodium acrylate, which are used as precipitants in gold suspensions or gels for gold separation. The polymer specified in the example contains 13.3 mol % of AMPS, 13.3 mol % of sodium acrylate and 73.4 mol % of acrylamide, and was prepared with the aid of an aqueous free-radical polymerization. However, the disadvantage of these polymers is an unwanted influence on the cement properties (reduction in hardened cement strength) and the delaying effect on the solidification of the cement. As an additive in cement slurries, the polymer also does not exhibit any effects which contribute to reduction in water loss in cement slurries.

Additives on the market which are used as water loss reducers in cement slurries for cementing deep wells are acryloyldimethyltaurate and copolymers thereof (e.g. HOSTAMER®4707 from Clariant). However, these in turn have the disadvantage that they lead to an increase in water loss below a temperature of 180° C. (356° F.).

The multitude of polymers developed for reduction of water release makes it clear that it is always problematic to formulate a cement slurry which is optimal for application purposes for a temperature range between 30° C. (86° F.) and 200° C. (392° F.). A significant influence on the suitability thereof is exerted by the temperature of the wellbore section which is being prepared for cementing. The polymers optimized for different temperatures constitute major logistical problems because a certain stock of extra water loss-reducing polymers always has to be kept at sites all over the world.

It was therefore an object of the present invention to provide substances which can help to achieve improved control of liquid loss in the cement slurries for cementing wellbores at temperatures between 80° F. and 300° F.

It has now been found that, surprisingly, the performance properties required can be achieved through the copolymerization of acryl-, methacryl- or ethacrylamidoalkylsulfonic acid or salts thereof and with carboxyalkyl acrylate, methacrylate or ethacrylate or oligomers of these carboxyl compounds, and with acrylamides or alkylacrylamides, when the polymerization process is altered and the subsequent hydrolysis is dispensed with, and hence a novel polymer which has not been described to date is prepared. This polymer also does not have any set-delaying properties below 50° C.

The present invention provides water-soluble or water-swellable polymers having a k value of 100 to 300, measured in 0.5% by weight solution in distilled water, containing a) 25-35 mol % of one or more recurrent structural units of the formula (1)

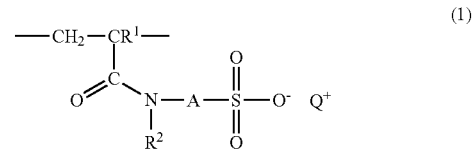

in which $R^1$, $R^2$ are hydrogen, methyl or ethyl,

A is linear or branched $C_1$-$C_{12}$-alkylene, and $Q^+$ is $H^+$, $NH_4^+$, $Li^+$, $Na^+$, $K^+$, ½ $Ca^{++}$, ½ $Mg^{++}$, ½ $Zn^{++}$, ⅓ $Al^{+++}$, organic ammonium ions of the formula $[HNR^5R^6R^7]^+$ where $R^5$, $R^6$ and $R^7$ may each independently be hydrogen, a linear or branched alkyl group having 1 to 22 carbon atoms, a linear or branched, mono- or polyunsaturated alkenyl group having 2 to 22 carbon atoms, a $C_6$-$C_{22}$-alkylamidopropyl group, a linear monohydroxyalkyl group having 2 to 10 carbon atoms or a linear or branched dihydroxyalkyl group having 3 to 10 carbon atoms, and where at least one of the $R^5$, $R^6$ and $R^7$ radicals is not hydrogen, or mixtures of these ions, b) 3 to 8 mol % of one or more recurrent structural units of the formula (2)

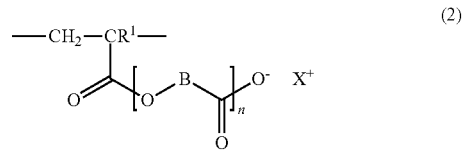

in which
- $R^1$ is hydrogen, methyl or ethyl,
- $X^+$ is $H^+$, $NH_4^+$, $Li^+$, $Na^+$, $K^+$, ½ $Ca^{++}$, ½ $Mg^{++}$, ½ $Zn^{++}$, ⅓ $Al^{+++}$, organic ammonium ions of the formula $[HNR^5R^6R^7]^+$ where $R^5$, $R^6$ and $R^7$ may each independently be hydrogen, a linear or branched alkyl group having 1 to 22 carbon atoms, a linear or branched, mono- or polyunsaturated alkenyl group having 2 to 22 carbon atoms, a $C_6$-$C_{22}$-alkylamidopropyl group, a linear monohydroxyalkyl group having 2 to 10 carbon atoms or a linear or branched dihydroxyalkyl group having 3 to 10 carbon atoms, and where at least one of the $R^5$, $R^6$ and $R^7$ radicals is not hydrogen, or mixtures of these ions,
- B is a chemical bond, or a linear or branched alkylene group having 1 to 6 carbon atoms, and
- n is an integer from 0 to 5, and c) 57 to 72 mol % of one or more recurrent structural units of the formula (3)

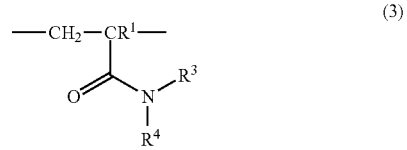

(3)

in which
- $R^1$ is hydrogen, methyl or ethyl, and
- $R^3$ and $R^4$ are each independently hydrogen, methyl, ethyl, n-propyl, isopropyl or butyl.

The invention further provides for the use of the polymers of the invention as water loss reducers for cement formulations. Preferably, 0.05% to 5% by weight of the polymers, based on the weight of the cement formulation, is used in cement formulations.

In a polymer of the invention, it is possible in each case for different structural units of the formula (1) and/or of the formula (2) and/or of the formula (3) to be present. A polymer of the invention may, for example, contain several structural units of the formula (1) which differ from one another by different counterions $Q^+$. A polymer of the invention may, for example, also contain several structural units of the formula (2) which differ from one another by different counterions $X^+$. A polymer of the invention may, for example, also contain several structural units of the formula (3) which differ by different $R^1$, $R^3$ and $R^4$ radicals. The $R^1$ radicals in the structural units of the formulae (1), (2) and (3) may be identical or different in all the structural units.

The weight-average molecular weights of these polymers are preferably 300 000 to 5 000 000, more preferably 500 000 to 4 000 000, especially 600 000 to 2 500 000 g/mol. The weight-average molecular weights can be determined with the aid of gel permeation chromatography (GPC). The procedure for determining the weight-average molecular weight with the aid of GPC is described in detail in "Makromolekulare Chemie: Eine Einführung" [Macromolecular Chemistry: An Introduction] by Bernd Tieke, Wiley-VCH, 2nd fully revised and extended edition (Sep. 9, 2005) ISBN-10: 3527313796 in chapter 3. The polymers were analyzed against a polystyrenesulfonate standard.

Indicators used for the molecular weight are the relative viscosity and the k value. To determine the k value, the copolymer is dissolved in distilled water in a concentration of 0.5% by weight and the outflow time at 20° C. is determined by means of an Ubbelohde viscometer. This value gives the absolute viscosity of the solution ($\eta_c$). The absolute viscosity of the solvent is ($\eta_0$). The ratio of the two absolute viscosities gives the relative viscosity:

$$Z = \frac{n_c}{n_0}$$

The relative viscosity Z and the concentration C can be used to determine the k value by means of the following equation:

$$Lg\, z = \left(\frac{75*k^2}{1+1.5kc} + k\right)*c$$

The k value of the polymers of the invention is from 100 to 300, preferably from 150 to 270 and especially preferably from 180 to 250.

In the structural units of the formula (1), $R^1$ is preferably hydrogen or methyl and more preferably hydrogen.

In the structural units of the formula (1), A is preferably a structural unit of the formula —$C(CH_3)_2$—$CH_2$—.

The structural units of the formula (1) are preferably derived from monomers from the group consisting of acryloyldimethyltaurate, acryloyl-1,1-dimethyl-2-methyltaurate, acryloyltaurate, acryloyl-N-methyltaurate, preferably acryloyldimethyltaurate.

Preferably, the neutralization level of the structural units of the formula (1) is from 50.0 to 100 mol %, more preferably from 80.0 to 100 mol %, especially preferably from 90.0 to 100 mol % and exceptionally preferably from 95.0 to 100 mol %.

In the structural units of the formula (1), Q is partly H+ if neutralization is incomplete. In the case of partial or complete neutralization, Q+ is preferably selected from $NH_4^+$, $Ca^{2+}$ and $Na^+$ and mixtures of these ions. More preferably, the counterion Q other than $H^+$ is $NH_4^+$.

In the structural units of the formula (2), $R^1$ is preferably hydrogen or methyl and more preferably hydrogen.

In the structural units of the formulae (2), B is preferably a chemical bond or a structural unit of the formula —$CH_2$—$CH_2$—.

In the structural units of the formula (2), n is preferably 0 to 5 and more preferably 0 to 3 and especially preferably 0 or 1.

Preferably, the proportion of structural units of the formula (2) in which n is 0 within component b) of the polymers of the invention is at least 70.0 mol %, more preferably at least 80.0 mol %, especially preferably at least 90.0 mol %, exceptionally preferably at least 95.0 mol %.

More preferably, in the structural units of the formula (2), B is a chemical bond or the —$CH_2CH_2$— group.

In a further preferred embodiment, in the structural units of the formula (2), B is a chemical bond or the —$CH_2CH_2$— group and n is an integer from 1 to 5, and preferably from 1 to 3 and more preferably 1.

In the structural units of the formula (2), X is partly H+ if neutralization is incomplete. In the case of partial or complete neutralization, X is preferably selected from $NH_4^+$, $Ca^{2+}$ and $Na^+$ and mixtures of these ions. More preferably, the counterion X that is not $H^+$ is $NH_4^+$ In a further particularly preferred embodiment of the invention, $X^+$ is $H^+$.

In a further particularly preferred embodiment of the invention, the polymers of the invention contain several different structural units of the formula (2), where the counterions $X^+$ in some structural units of the formula (2) are defined as $H^+$ and the counterions $X^+$ in the other structural units of the formula (2) are defined differently than $H^+$, and preferably as $NH_4^+$.

In a further particularly preferred embodiment of the invention, the polymers of the invention contain several different structural units of the formula (2) which differ in terms of $R^1$, b and/or n.

These structural units are preferably derived from monomers from the group consisting of methacrylic acid, acrylic acid, carboxyethyl acrylate and higher oligomers of the formula (2) in which n is an integer of 2 or more.

Especially preferably, the structural units are derived from methacrylic acid, acrylic acid and carboxyethyl acrylate. Particular preference is given to methacrylic acid and acrylic acid.

The structural units of the formula (3) are preferably derived from monomers from the group consisting of acrylamide, N-methylacrylamide, N-ethylacrylamide, N,N-diethylmethacrylamide, N,N-diethylacrylamide, N,N-dimethylmethacrylamide, N,N-dimethylacrylamide, N-isopropylacrylamide, N-tert-butylacrylamide and N-butylacrylamide, preferably acrylamide, methacrylamide, N,N-diethylacrylamide, N,N-dimethylacrylamide, isopropylacrylamide, more preferably acrylamide, methacrylamide, N,N-dimethylacrylamide, especially preferably acrylamide.

In a further embodiment of the invention, the polymers of the invention preferably contain
 a) 27.5 to 32.5 mol % of structural units of the formula (1),
 b) 4.5 to 7.5 mol % of structural units of the formula (2), and
 c) 60 to 68 mol % of structural units of the formula (3).

In a further preferred embodiment of the invention, the structural units of the formula (1) are derived from acryloyldimethyltaurate, those of the formula (2) are derived from acrylic acid and those of the formula (3) are derived from acrylamide.

Particularly preferred polymers of the invention contain structural units of
 a) 25 to 35 mol % of acryloyldimethyltaurate, and
 b) 3 to 8 mol % of acrylic acid, and
 c) 57 to 72 mol % of acrylamide.

A further embodiment of particularly preferred polymers of the invention contains structural units of
 a) 27.5 to 32.5 mol % of acryloyldimethyltaurate, and
 b) 4.5 to 7.5 mol % of acrylic acid, and
 c) 60 to 68 mol % of acrylamide.

In a further preferred embodiment of the invention, the polymers of the invention do not contain any cationic structural units.

The distribution of the different structural units in the polymers of the invention may be random, blockwise or in alternating or gradient form. The polymers of the invention are generally prepared by free-radical polymerization.

Free-radical polymerizations are common knowledge to those skilled in the art and are described in detail in standard literature works, for example in "Makromolekulare Chemie: Eine Einführung" by Bernd Tieke, Wiley-VCH, 2nd fully revised and extended edition (Sep. 9, 2005) ISBN-10: 3527313796.

The polymers of the invention are preferably prepared by means of free-radical precipitation polymerization in a polar solvent or solvent mixture. This involves dissolving or dispersing the corresponding monomers, for example, in the polar solvent or solvent mixture and initiating the polymerization in a manner known per se, for example by adding a free radical-forming compound. It is possible here, for example, for the initially charged monomers to be polymerized "directly". Alternatively, they may also be neutralized prior to the polymerization, for example by reacting acidic groups in monomers used with bases prior to the polymerization, forming the counterions $Q^+$ of the structural units of formula (1) or $X^+$ of the structural units of formula (2). Instead of the neutralization of the monomers prior to the polymerization, however, it is also possible to neutralize the polymers with the bases on completion of polymerization.

The present invention therefore further provides a process for preparing the polymers of the invention, wherein monomers from which the structural units of components a) to c) derive are free-radically polymerized in a polar solvent or solvent mixtures comprising such solvents, and the monomers are optionally neutralized prior to the polymerization, or the polymer is neutralized after the polymerization, with ammonia or organic amines or an $Li^+$—, $Na^+$—, $K^+$—, $Ca^{++}$—, $Mg^{++}$—, $Zn^{++}$— or $Al^{+++}$— containing base, preferably with the corresponding hydroxides or carbonates and more preferably with hydroxides.

Useful polymerization initiators include all free radical-forming substances; as well as typical diazo compounds and peroxy compounds, initiation is also possible by means of redox initiators, a photoinitiator or by means of high-energy radiation (UV, neutrons, plasma). In contrast to aqueous free-radical polymerization, there is only a minor dependence of the product on the type and amount of the initiator system used.

In a preferred embodiment of the process for preparing the polymers of the invention, the free-radical precipitation polymerization is effected in a polar solvent or solvent mixture which is characterized in that the solvent or solvent mixture has a boiling point of 60 to 110° C., preferably of 60 to 85° C., more preferably of 70 to 85° C.

In a further preferred embodiment of the process for preparing the polymers of the invention, the polar solvent contains:
 d) water and
 e) one or more further polar solvents, preferably alcohols, dialkyl ketone and cyclic ethers, more preferably alcohols, dialkyl ketone and especially preferably alcohols.

In a further preferred embodiment of the process for preparing the polymers of the invention, component e) contains one or more polar solvents selected from the group of methanol, ethanol, 1-propanol, 2-propanol, 2-methyl-2-propanol, 2-butanol, dimethyl ketone, diethyl ketone, tetrahydropyran, tetrahydrofuran, 2-methyltetrahydrofuran, 1,3-dioxane, 1,4-dioxane, preferably ethanol, 1-propanol, 2-propanol, 2-methylpropan-2-ol, 2-butanol, dimethyl ketone, tetrahydrofuran, 2-methyltetrahydrofuran, 1,3-dioxane, more preferably 2-propanol, 2-methylpropan-2-ol, dimethyl ketone, tetrahydrofuran, 2-methyltetrahydrofuran, 1,3-dioxane, especially preferably 2-methylpropan-2-ol, dimethyl ketone and exceptionally preferably 2-methylpropan-2-ol.

In the process for preparing the polymers of the invention, it is possible for various polar solvents of component e) to be present. One polar solvent of the invention in component e) may, for example, comprise 2-methylpropan-2-ol. A further solvent of the invention in component e) may, for example, comprise a mixture of 2-methylpropan-2-ol and dimethyl ketone. A further solvent of the invention in component e) may, for example, comprise a mixture of 2-methylpropan-2-ol and tetrahydrofuran.

In a particular embodiment of the process for preparing a polymer of the invention, the polar solvent mixture contains 0.5% to 20% by weight, preferably 0.5% to 10% by weight and more preferably 1% to 8% by weight of water and exceptionally preferably 2% to 5% by weight of water.

In a further particular embodiment of the process for preparing a polymer of the invention, the polar solvent mixture contains 5% to 99.5% by weight, preferably 10% to 99.5% by weight and more preferably 30% to 99.5% by weight of 2-methylpropan-2-ol.

In a further particular embodiment of the process for preparing a polymer of the invention, the polar solvent mixture contains 0.5% to 20% by weight of water, 7.5% to 92% by weight of 2-methylpropan-2-ol and 7.5% to 92% by weight of dimethyl ketone, preferably 0.5% to 7.5% by weight of water, 20% to 89.5% by weight of 2-methylpropan-2-ol and 10% to 79.5% by weight of dimethyl ketone.

In an exceptionally preferred process for preparing an inventive polymer, 27.5 to 32.5 mol % of acryloyldimethyltaurate, 4.5 to 7.5 mol % of acrylic acid and 60 to 68 mol % of acrylamide are free-radically polymerized in a polar solvent mixture, preferably a mixture of 1% to 8% by weight of water and 92% to 99% by weight of 2-methylpropan-2-ol, and the monomers are optionally neutralized prior to the polymerization, or the polymer is neutralized after the polymerization, with ammonia, ammonium carbonate, sodium hydroxide, sodium carbonate, preferably with ammonia.

The polymers are obtained as a white voluminous precipitate in the polar solvent mixture. For isolation, it is possible to use all the customary evaporation and drying isolation processes. More particularly, the polar solvent mixture can be removed from the product by a pressure filtration or distillation. A small residue of the polar solvent mixture is of no concern, either for safety reasons or for application reasons.

The invention further provides a method for cementing deep wells using a cement slurry containing the polymer of the invention in a concentration of 0.01% to 5% bwoc (by weight of cement), preferably 0.05% to 0.9% bwoc. Further components of the cement slurry are waters of different salinity and cement. In addition, it is possible to use dispersants, retardants, accelerators, extenders, foamers, defoamers, weighting agents, density-reducing additives and tensile strength-increasing fibers or silicate derivatives as auxiliary additives.

The invention further provides a method for cementing deep wells using a cement slurry containing a mixture of the inventive polymer and starch in a concentration of 0.01% to 5% bwoc (by weight of cement), preferably 0.05% to 0.9% bwoc. Further components of the cement slurry are waters of different salinity and cement. In addition, it is possible to use dispersants, retardants, accelerators, extenders, foamers, defoamers, weighting agents, density-reducing additives and tensile strength-increasing fibers or silicate derivatives as auxiliary additives.

The term "starch" is understood to mean an organic compound. Starch is a polysaccharide having the formula $(C_6H_{10}O_5)_n$ which consists of α-D-glucose units joined to one another via glycosidic bonds. Starch may consist of:
  0% to 100% by weight of amylose, linear chains having a helical (screw) structure, having only α-1,4-glycosidic linkages, and 0% to 100% by weight of amylopectin, highly branched structures, having α-1,6-glycosidic and α-1,4-glycosidic linkages. However, the amylopectin of starch, with about one α-1,6-glycosidic bond after about 30 α-1,4-glycosidic linkages, is less highly branched than that of glycogen (about 1 α-1,6-glycosidic bond for every 10 α-1,4-glycosidic bonds).

In this part of the world, starch is usually obtained from potatoes or cereals, but also from numerous other plants, such as rice (broken rice from rice dehusking factories) and corn. Another starch-providing plant of international significance is manioc (tapioca). In industrial starch production, various technologies are used according to the raw material.

In a particular embodiment of the invention, the starch can be thermally modified in an upstream step. The starch can physically bind several times its own weight of water, swell up and gelatinize under the action of heat. When heated with water, the starch swells at 47-57° C., the layers break up and gelatinized starch forms at 55-87° C. (potato starch at 62.5° C., wheat starch at 67.5° C.), having different stiffening capacity according to the starch type. The use of natural, non-pregelatinized starch has the advantage that, during the pumping of a cement slurry, this cement slurry is rheologically stabilized when the temperature increases.

In a further particular embodiment of the invention, the starch may be in a chemically modified form. Modified starch, according to which properties are to be modified, is produced by various chemical conversion processes. In the case of some modified starches, several conversion processes are conducted in succession (e.g. acetylated oxidized starch). Modified starches modified by chemical conversion processes are understood to mean:
  acid-treated starch by reaction with acids (for example with hydrochloric acid, phosphoric acid or sulfuric acid)
  alkali-modified starch by reaction with alkalis (for example with sodium hydroxide solution or potassium hydroxide solution)
  bleached starch by treatment with peroxyacetic acid, hydrogen peroxide, sodium hypochlorite, sodium chlorite, sulfur dioxide, sulfites, potassium permanganate or ammonium persulfate
  enzymatically modified starch by treatment with amylases
  oxidized starch by oxidation (for example with sodium hypochlorite)
  monostarch phosphate by esterification with phosphorous ester groups (for example phosphoric acid, sodium phosphate or potassium phosphate, phosphonic acid or pentasodium triphosphate)
  distarch phosphate by esterification with sodium trimetaphosphate or phosphorus oxychloride
  phosphated distarch phosphate by combination of the processes for preparing monostarch phosphate and distarch phosphate
  acetylated starch by esterification (for example with anhydrides)
  hydroxypropyl starch by reaction with propylene oxide
  sodium octenylsuccinate starch by reaction of starch with octenylsuccinic anhydride.

The most commonly desired improvements are in resistance to heat, cold and/or pH changes (acids).

The invention therefore further provides mixtures comprising the abovementioned starch and/or modifications thereof and the polymers of the invention. These mixtures preferably contain:
  25% to 75% by weight of starch and 25% to 75% by weight of the polymers of the invention.

In a particular embodiment, the mixtures contain 25% to 75% by weight of a chemically modified starch and 25% to 75% by weight of the polymers of the invention.

In a further particular embodiment, the mixtures contain 25% to 75% by weight of a thermally modified starch and 25% to 75% by weight of the polymers of the invention.

An inventive mixture of starch and the polymers of the invention can be obtained during the polymerization process after the actual polymerization and before the drying operation or isolation operation.

A further inventive mixture of starch and the polymers of the invention can be obtained by the mixing of the pulverulent starch with the pulverulent polymer of the invention.

EXAMPLES

In polymerization processes A to B described below, typical preparation processes for the polymers of the invention are described.

In the examples, there was variation of the polar solvent used, with the aid of which the polymers of the invention can be prepared. With the aid of polymerization methods A1 to A5 and B1 to B3, further polymers of the invention were prepared by the variation of the monomers. These polymers and polymerization processes used for the synthesis thereof are summarized in table 1a) to table 1i).

Polymerization process A1: Polymerization in 2-methylpropan-2-ol/water (3.5%) as polar solvent In a 2 liter Quickfit flask with anchor stirrer, reflux condenser with offgas scrubber, combined thermometer/pH meter and a gas inlet tube, 772 g of anhydrous 2-methylpropan-2-ol are admixed with 28 g of distilled water. The reaction vessel is within a thermostatted heating bath.

This reaction vessel is blanketed with nitrogen gas and, in a gentle nitrogen countercurrent, 113.2 g of acryloyldimethyltaurate are introduced. The acryloyldimethyltaurate does not dissolve completely in the 2-methylpropan-2-ol/water mixture and is partly in the form of a dispersion of solids. The pH of this mixture is below pH 1. Through the gas inlet tube, gaseous ammonia is introduced above the liquid phase until the pH of the dispersion is between 7 and 8. On attainment of the desired pH range, the mixture is stirred for another 1 hour and the pH is recorded continuously. The reaction vessel is blanketed with nitrogen and 79.2 g of acrylamide and 7.6 g of acrylic acid are introduced. After the acrylamide has been introduced, the pH is checked again and optionally corrected into the pH range of 7 to 8. A constant nitrogen stream is passed through the solution for at least 1 hour. After this inertization time, the residual oxygen is checked by means of an oxygen electrode. Should the measured value of residual oxygen in the liquid phase exceed the value of 1 ppm, another inertization is necessary until this value is attained. Thereafter, in a gentle nitrogen stream, 2 g of 2,2'-azobis(2,4-dimethylvaleronitrile) are added and the reaction tank is heated to 40° C. Shortly after attainment of an internal temperature of 40° C., the introduction of nitrogen gas is ended and commencement of the polymerization reaction is observed, which can be identified by a temperature increase of 10-35° C. About 5-15 minutes after onset of the polymerization reaction, the temperature maximum has been exceeded and the temperature in the reaction vessel is increased by means of the heating bath up to the boiling point of the 2-methylpropan-2-ol/water mixture. Under gentle reflux, the now viscous mixture is stirred for a further two hours. The reaction product, present in the form of a viscous suspension of polymer in the 2-methylpropan-2-ol/water mixture, is removed by filtration and subsequent drying in a vacuum drying cabinet.

Yield: 215.4 g of polymer 1
Dry content (IR drier, 15 minutes at 120° C.): 94%
K value (0.5% solution in distilled water): 212
pH (0.5% solution in distilled water): 4.76

Polymerization process A2: Polymerization in 2-methylpropan-2-ol/water (2%) In a 2 liter Quickfit flask with anchor stirrer, reflux condenser with offgas scrubber, combined thermometer/pH meter and a gas inlet tube, 784 g of anhydrous 2-methylpropan-2-ol are admixed with 16 g of distilled water. The reaction vessel is within a thermostatted heating bath. The further steps of polymerization process A2 are conducted analogously to polymerization process A1.

With the aid of polymerization method A2, further polymers of the invention were prepared by varying the monomers. These polymers are summarized in table 1.

Polymerization process A3: Polymerization in 2-methylpropan-2-ol/water (4.5%)

In a 2 liter Quickfit flask with anchor stirrer, reflux condenser with offgas scrubber, combined thermometer/pH meter and a gas inlet tube, 764 g of anhydrous 2-methylpropan-2-ol are admixed with 36 g of distilled water. The reaction vessel is within a thermostatted heating bath. The further steps of polymerization process A3 are conducted analogously to polymerization process A1.

Polymerization process A4: Polymerization in 2-methylpropan-2-ol/water (1.5%)

In a 2 liter Quickfit flask with anchor stirrer, reflux condenser with offgas scrubber, combined thermometer/pH meter and a gas inlet tube, 788 g of anhydrous 2-methylpropan-2-ol are admixed with 12 g of distilled water. The reaction vessel is within a thermostatted heating bath. The further steps of polymerization process A4 are conducted analogously to polymerization process A1.

Polymerization process A5: Polymerization in 2-methylpropan-2-ol/water (7.5%)

In a 2 liter Quickfit flask with anchor stirrer, reflux condenser with offgas scrubber, combined thermometer/pH meter and a gas inlet tube, 748 g of anhydrous 2-methylpropan-2-ol are admixed with 52 g of distilled water. The reaction vessel is within a thermostatted heating bath. The further steps of polymerization process A5 are conducted analogously to polymerization process A1.

Polymerization process B1: Polymerization in 2-methylpropan-2-ol, dimethyl ketone and water as polar solvent (50:50, 3.4% water)

In a 2 liter Quickfit flask with anchor stirrer, reflux condenser with offgas scrubber, combined thermometer/pH meter and a gas inlet tube, 384 g of anhydrous 2-methylpropan-2-ol and 384 g of dimethyl ketone are admixed with 26.4 g of distilled water. The reaction vessel is within a thermostatted heating bath.

This reaction vessel is blanketed with nitrogen gas and, in a gentle nitrogen countercurrent, 130 g of acryloyldimethyltaurate are introduced. The acryloyldimethyltaurate does not dissolve completely in the 2-methylpropan-2-ol/dimethyl ketone/water mixture and is partly in the form of a dispersion of solids. The pH of this mixture is below pH 1. Through the gas inlet tube, gaseous ammonia is introduced above the liquid phase until the pH of the dispersion is between 7 and 8. On attainment of the desired pH range, the mixture is stirred for another 1 hour and the pH is recorded continuously. The reaction vessel is blanketed with nitrogen and 60 g of acrylamide and 10 g of acrylic acid are introduced. After the acrylamide has been introduced, the pH is checked again and optionally corrected into the pH range of 7 to 8. A constant nitrogen stream is passed through the solution for at least 1 hour. After this inertization time, the residual oxygen is checked by means of an oxygen electrode. Should the measured value of residual oxygen in the liquid phase exceed the value of 1 ppm, another inertization is necessary until this value is attained. Thereafter, in a gentle nitrogen stream, 2.05 g of 2,2'-azobis(2,4-dimethylvaleronitrile) are added and the reaction tank is heated to 40° C. Shortly after attainment of an internal temperature of 40° C., the introduction of nitrogen gas is ended and commencement of the polymerization reaction is observed, which can be identified by a temperature increase of 10 to 35° C. About 5-15 minutes after onset of the polymerization reaction, the temperature maximum has been exceeded and the temperature in the reaction vessel is increased by means of the heating bath up to the boiling point of the 2-methylpropan-2-ol/water mixture. Under gentle reflux, the now viscous mixture is stirred for a further two hours. The reaction product, present in the form of a viscous suspension of polymer in the 2-methylpropan-2-ol/water mixture, is removed by filtration and subsequent drying in a vacuum drying cabinet.

Polymerization process B2: Polymerization in 2-methylpropan-2-ol, dimethyl ketone and water as polar solvent (75:25, 3.0% water)

In a 2 liter Quickfit flask with anchor stirrer, reflux condenser with offgas scrubber, combined thermometer/pH meter and a gas inlet tube, 582 g of anhydrous 2-methylpropan-2-ol and 194 g of dimethyl ketone are admixed with 24 g of distilled water. The reaction vessel is within a thermostatted heating bath. The further steps of polymerization process B2 are conducted analogously to polymerization process B1.

Polymerization process B3: Polymerization in 2-methylpropan-2-ol, dimethyl ketone and water as polar solvent (25:75, 5.0% water)

In a 2 liter Quickfit flask with anchor stirrer, reflux condenser with offgas scrubber, combined thermometer/pH meter and a gas inlet tube, 194 g of anhydrous 2-methylpropan-2-ol and 582 g of dimethyl ketone are admixed with 24 g of distilled water. The reaction vessel is within a thermostatted heating bath. The further steps of the polymerization process are conducted analogously to polymerization process B1.

TABLE 1a

Examples of polymers of the invention prepared by polymerization processes A1 to A5 and B1 to B3

| Polymer | Process | ACDMT g | ACDMT mol % | Acrylic acid g | Acrylic acid mol % | Acrylamide g | Acrylamide mol % | V-65® g | V-65® % by wt. | k value |
|---|---|---|---|---|---|---|---|---|---|---|
| 2 | A1 | 110.0 | 29.6 | 10.00 | 7.7 | 80.0 | 62.7 | 2.00 | 1.0 | 215 |
| 4 | A1 | 113.2 | 30.9 | 7.60 | 6.0 | 79.2 | 63.1 | 2.00 | 1.0 | 210 |
| 6 | A1 | 98.0 | 32.0 | 6.40 | 6.0 | 65.0 | 61.9 | 1.90 | 1.1 | 208 |
| 7 | A1 | 119.0 | 32.5 | 5.70 | 4.5 | 79.2 | 63.0 | 2.25 | 1.1 | 200 |
| 8 | A1 | 104.5 | 28.5 | 9.60 | 7.5 | 80.4 | 64.0 | 2.25 | 1.2 | 204 |
| 12 | A2 | 110.0 | 29.6 | 10.00 | 7.7 | 80.0 | 62.7 | 2.25 | 1.1 | 192 |
| 13 | A2 | 113.2 | 30.9 | 7.60 | 6.0 | 79.2 | 63.1 | 2.20 | 1.1 | 188 |
| 14 | A2 | 119.0 | 32.5 | 5.70 | 4.5 | 79.2 | 63.0 | 2.20 | 1.1 | 179 |
| 16 | A3 | 113.2 | 30.9 | 7.60 | 6.0 | 79.2 | 63.1 | 2.20 | 1.1 | 216 |
| 18 | A3 | 110.0 | 29.6 | 10.00 | 7.7 | 80.0 | 62.7 | 2.25 | 1.1 | 222 |
| 20 | A4 | 90.0 | 25.1 | 6.20 | 5.0 | 86.0 | 69.9 | 2.18 | 1.2 | 176 |

TABLE 1b

Examples of polymers of the invention prepared by polymerization processes A1 to A5 and B1 to B3

| Polymer | Process | ACDMT g | ACDMT mol % | Acrylic acid g | Acrylic acid mol % | Acrylamide g | Acrylamide mol % | V-65® g | V-65® % by wt. | k value |
|---|---|---|---|---|---|---|---|---|---|---|
| 25 | B1 | 109.5 | 29.5 | 9.70 | 7.5 | 80.3 | 63.0 | 2.30 | 1.2 | 203 |
| 26 | B1 | 100.0 | 28.5 | 6.10 | 5.0 | 80.0 | 66.5 | 2.10 | 1.1 | 211 |
| 28 | B1 | 113.2 | 31.0 | 7.60 | 6.0 | 79.0 | 63.0 | 2.20 | 1.1 | 213 |
| 31 | B2 | 99.5 | 34.5 | 8.00 | 8.0 | 56.8 | 57.5 | 1.80 | 1.1 | 219 |
| 33 | B2 | 110.0 | 34.3 | 3.40 | 3.0 | 69.0 | 62.7 | 2.00 | 1.1 | 227 |
| 34 | B2 | 119.0 | 32.5 | 5.70 | 4.5 | 79.2 | 63.0 | 2.25 | 1.1 | 228 |
| 35 | B2 | 110.0 | 29.6 | 10.00 | 7.7 | 80.0 | 62.7 | 2.25 | 1.1 | 221 |
| 36 | B2 | 113.2 | 30.9 | 7.60 | 6.0 | 79.2 | 63.1 | 2.25 | 1.1 | 227 |
| 38 | B3 | 113.2 | 30.9 | 7.60 | 6.0 | 79.2 | 63.1 | 2.20 | 1.1 | 216 |
| 40 | B3 | 110.0 | 29.6 | 10.00 | 7.7 | 80.0 | 62.7 | 2.25 | 1.1 | 218 |

TABLE 1c

Polymers of the invention by polymerization process A1

| Polymer | Process | ACDMT mol % | Methacrylic acid mol % | Acrylamide mol % | V-65 ® g | k value |
|---|---|---|---|---|---|---|
| 42 | A1 | 30 | 7 | 63 | 2.00 | 208 |
| 44 | A1 | 31 | 6 | 63 | 2.00 | 219 |

TABLE 1d

Polymers of the invention by polymerization process A1

| Polymer | Process | ACDMT mol % | Methacrylic acid mol % | Dimethyl-acrylamide mol % | V-65 ® g | k value |
|---|---|---|---|---|---|---|
| 47 | A1 | 30 | 7 | 63 | 2.0 | 201 |
| 49 | A1 | 31 | 6 | 63 | 2.0 | 198 |

TABLE 1e

Polymers of the invention by polymerization process A1

| Polymer | Process | ACDMT mol % | CEA mol % | Acrylamide mol % | V-65 ® g | k value |
|---|---|---|---|---|---|---|
| 52 | A1 | 30 | 7 | 63 | 2.0 | 217 |
| 54 | A1 | 31 | 6 | 63 | 2.0 | 209 |

TABLE 1f

Polymers of the invention by polymerization process A1

| Polymer | Process | ACDMT mol % | CEA mol % | Dimethyl-acrylamide mol % | V-65 ® g | k value |
|---|---|---|---|---|---|---|
| 57 | A1 | 30 | 7 | 63 | 2.0 | 218 |
| 59 | A1 | 31 | 6 | 63 | 2.0 | 207 |

TABLE 1g

Polymers of the invention by polymerization process A1

| Polymer | Process | ACDMT mol % | CEA oligomer mol % | Acrylamide mol % | V-65 ® g | k value |
|---|---|---|---|---|---|---|
| 62 | A1 | 30 | 7 | 63 | 2.0 | 214 |
| 64 | A1 | 31 | 6 | 63 | 2.0 | 205 |

TABLE 1h

Polymers of the invention by polymerization process A1

| Polymer | Process | ACDMT mol % | CEA oligomer mol % | Dimethyl-acrylamide mol % | V-65 ® g | k value |
|---|---|---|---|---|---|---|
| 67 | A1 | 30 | 7 | 63 | 2.0 | 208 |
| 69 | A1 | 31 | 6 | 63 | 2.0 | 218 |

ACDMT=acryloyldimethyltaurate
AA=acrylic acid
AM=acrylamide
CEA=carboxyethyl acrylate
CEA oligomer=carboxyethyl acrylate oligomer mixture with n=0 to 5

V-65=2,2'-azobis(2,4-dimethylvaleronitrile)/V-65 is a registered trademark of Wako Pure Chemicals Industries, Ltd Comparative Example 1 (not in accordance with the invention, prepared according to EP-1045869, copolymer prepared in precipitation polymerization, 44.5 mol % of acryloyldimethyltaurate and 55.5 mol % of acrylamide).

In a 3 liter Quickfit flask with anchor stirrer, reflux condenser with offgas scrubber, combined thermometer/pH meter and a gas inlet tube, 1700 g of anhydrous 2-methylpropan-2-ol are admixed with 50 mL of distilled water. The reaction vessel is within a thermostatted heating bath.

This reaction vessel is blanketed with nitrogen gas and, in a gentle nitrogen countercurrent, 245 g of acryloyldimethyltaurate are introduced. The acryloyldimethyltaurate does not dissolve completely in the 2-methylpropan-2-ol/water mixture and is partly in the form of a dispersion of solids. The pH of this mixture is below pH 1. Through the gas inlet tube, gaseous ammonia is introduced above the liquid phase until the pH of the dispersion is between 7 and 8. On attainment of the desired pH range, the mixture is stirred for another 1 hour and the pH is recorded continuously. The reaction vessel is blanketed with nitrogen and 105 g of acrylamide are introduced. After the acrylamide has been introduced, the pH is checked again and optionally corrected into the pH range of 7 to 8. A constant nitrogen stream is passed through the solution for at least 1 hour. After this inertization time, the residual oxygen is checked by means of an oxygen electrode. Should the measured value of residual oxygen in the liquid phase exceed the value of 1 ppm, another inertization is necessary until this value is attained. Thereafter, in a gentle nitrogen stream, 2 g of AIBN are added and the reaction tank is heated to 60° C. Shortly after attainment of an internal temperature of 60° C., the introduction of nitrogen gas is ended and commencement of the polymerization reaction is observed, which can be identified by a temperature increase of 10-15° C. About 5-15 minutes after onset of the polymerization reaction, the temperature maximum has been exceeded and the temperature in the reaction vessel is increased by means of the heating bath up to the boiling point of the 2-methylpropan-2-ol/water mixture. Under gentle reflux, the now viscous mixture is stirred for a further two hours. The reaction product, present in the form of a viscous suspension of polymer in the 2-methylpropan-2-ol/water mixture, is removed by filtration and subsequent drying in a vacuum drying cabinet.

Yield: 365 g

Dry content (IR drier, 15 minutes at 120° C.): 96%

K value (0.5% solution in distilled water): 212

Comparative Example 2 (not in accordance with the invention, prepared according to EP-0244981, copolymer prepared in an aqueous gel polymerization, 18.6 mol % of acryloyldimethyltaurate, 10 mol % of acrylic acid and 71.3 mol % of acrylamide)

In EP-0244981, reference is made in the examples to a gel polymerization in a conventional manner. No detailed preparation process for the polymers in EP-0244981 is described.

For comparative example 2, a 1 liter Quickfit flask with anchor stirrer, reflux condenser with offgas scrubber, combined thermometer/pH meter and a gas inlet tube was initially charged with 390 g of distilled water, 40 g of acryloyldimethyltaurate, 7.5 g of acrylic acid and 52.5 g of acrylamide. Nitrogen gas is passed through the reaction solution for 1 hour. Thereafter, 2 g of ammonium peroxodisulfate dissolved in 10 g of distilled water are added as initiator. This mixture is heated to 40° C. until a polymerization reaction occurs after 10-15 minutes. After passing through the temperature maximum, the internal temperature is adjusted to 60° C. by means of the thermostat. A clear gel of high viscosity forms. The gel is comminuted mechanically and dried in a vacuum drying cabinet.

Comparative Example 3 (not in accordance with the invention, prepared according to EP-0244981, copolymer prepared in an aqueous gel polymerization, 34 mol % of acryloyldimethyltaurate, 11.4 mol % of acrylic acid and 54.6 mol % of acrylamide)

For comparative example 3, a 1 liter Quickfit flask with anchor stirrer, reflux condenser with offgas scrubber, combined thermometer/pH meter and a gas inlet tube was initially charged with 390 g of distilled water, 60 g of acryloyldimethyltaurate, 7 g of acrylic acid and 11.4 g of acrylamide. Nitrogen gas is passed through the reaction solution for 1 hour. Thereafter, 2 g of ammonium peroxodisulfate dissolved in 10 g of distilled water are added as initiator. This mixture is heated to 40° C. until a polymerization reaction occurs after 10-15 minutes. After passing through the temperature maximum, the internal temperature is adjusted to 60° C. by means of the thermostat. A clear gel of high viscosity forms. The gel is comminuted mechanically and dried in a vacuum drying cabinet.

Comparative Example 4 (not in accordance with the invention, prepared according to EP-0244981, copolymer prepared in an aqueous gel polymerization, 10.3 mol % of acryloyldimethyltaurate, 5.9 mol % of acrylic acid and 84.9 mol % of acrylamide). Comparative example 4 was prepared analogously to comparative example 2.

For comparative example 4, a 1 liter Quickfit flask with anchor stirrer, reflux condenser with offgas scrubber, combined thermometer/pH meter and a gas inlet tube was initially charged with 390 g of distilled water, 25 g of acryloyldimethyltaurate, 5 g of acrylic acid and 70 g of acrylamide. Nitrogen gas is passed through the reaction solution for 1 hour. Thereafter, 2 g of ammonium peroxodisulfate dissolved in 10 g of distilled water are added as initiator. This mixture is heated to 40° C. until a polymerization reaction occurs after 10-15 minutes. After passing through the temperature maximum, the internal temperature is adjusted to 60° C. by means of the thermostat. A clear gel of high viscosity forms. The gel is comminuted mechanically and dried in a vacuum drying cabinet.

Comparative Example 5 (not in accordance with the invention, prepared according to U.S. Pat. No. 4,015,991, copolymer prepared in an aqueous gel polymerization, 10.3 mol % of acryloyldimethyltaurate, 5.9 mol % of acrylic acid and 84.9 mol % of acrylamide).

A 3 liter Quickfit flask with anchor stirrer, reflux condenser with offgas scrubber, combined thermometer/pH meter and a gas inlet tube is initially charged with 328 g of distilled water and 116.4 g of acryloyldimethyltaurate. The acryloyldimethyltaurate is neutralized by adding 45 g of a 50% sodium hydroxide (NaOH) solution. After the neutralization reaction, a clear solution having a pH between 7 and 8 is obtained. 14.7 g of acrylamide are dissolved gradually in the solution thus neutralized. Nitrogen gas is passed through the reaction solution for 1 hour. Thereafter, 0.69 g of tert-butyl peroxypivalate and 1.0 mL of an iron ammonium sulfate solution as redox initiator pair are added. The iron ammonium sulfate solution is prepared by dissolving 0.098 g of $Fe(NH_4)_2(SO_4)_2$ in 500 g of water. This mixture is additionally stirred at room temperature until, after 1-2 hours, a polymerization reaction occurs. The exothermic polymerization reaction, in the case of adiabatic polymerization, increases the temperature to 50-60° C. After passing through the temperature maximum, the internal temperature is adjusted to 60° C. by means of the thermostat. A clear gel of high viscosity is formed. The gel is comminuted mechanically and dried on a roller drier.

Yield: 152 g of comparative polymer 5

According to the testing in U.S. Pat. No. 4,015,991, this base polymer should have only poor water-loss reducing action. In contrast, at low temperatures, 28° C., the partly hydrolyzed products should have good performance properties. These products were prepared and tested as in comparative example 6.

Comparative Example 6 (not in accordance with the invention, prepared according to U.S. Pat. No. 4,015,991)
Controlled hydrolysis of comparative polymer 5

45.3 g of comparative polymer 5 are dissolved in 1500 mL of distilled water while stirring. On completion of dissolution of the polymer, 1.68 g of potassium hydroxide which have been dissolved in 20 mL of water beforehand are added thereto. This mixture is heated to 60° C. then stirred at this temperature for one hour. The reaction product is dried again with the aid of a roller drier. In this way, 50% hydrolysis is achieved.

Examples: Synergistic Mixtures Comprising Starch and the Polymers of the Invention For the synergistic mixtures comprising starch and the polymers of the invention, the following starch types were used:

Starch A: corn starch

Starch B: manioc starch

Starch C: "cook up modified starch"

Starch D: hydroxypropyl starch

Table 2 describes the mixtures made with the starches A to E and the polymers of the invention.

TABLE 2a

Synergistic mixtures comprising starch and the polymers of the invention

| Mixture | Starch | % by wt. | Polymer | % by wt. |
|---|---|---|---|---|
| 1 | A | 30 | (4) | 70 |
| 2 | A | 50 | (4) | 50 |
| 3 | A | 70 | (4) | 30 |
| 4 | B | 50 | (4) | 50 |
| 5 | D | 60 | (4) | 40 |
| 6 | A | 25 | (42) | 75 |
| 7 | A | 40 | (42) | 60 |
| 8 | A | 65 | (42) | 35 |

TABLE 2a-continued

Synergistic mixtures comprising starch and the polymers of the invention

| Mixture | Starch | % by wt. | Polymer | % by wt. |
|---|---|---|---|---|
| 9 | B | 25 | (42) | 75 |
| 10 | B | 40 | (42) | 60 |
| 11 | B | 65 | (42) | 35 |
| 12 | B | 50 | (52) | 50 |
| 13 | C | 50 | (52) | 50 |
| 14 | D | 50 | (52) | 50 |

TABLE 2b

Synergistic mixtures comprising starch and the polymers of the invention

| Mixture | Starch | % by wt. | Polymer | % by wt. |
|---|---|---|---|---|
| 15 | D | 40 | (52) | 60 |
| 16 | D | 60 | (52) | 40 |
| 17 | A | 75 | (7) | 25 |
| 18 | D | 50 | (7) | 50 |
| 25 | A | 45 | (26) | 55 |
| 26 | E | 65 | (26) | 35 |
| 27 | A | 50 | (49) | 50 |
| 28 | A | 45 | (49) | 50 |
| 29 | A | 65 | (49) | 35 |
| 30 | B | 50 | (49) | 50 |
| 31 | C | 45 | (49) | 50 |
| 32 | D | 65 | (49) | 35 |
| 33 | A | 50 | (54) | 50 |
| 34 | B | 50 | (54) | 50 |
| 35 | D | 50 | (54) | 50 |

Examples: Test Results

The testing is effected according to API spec. 10. In an atmospheric consistometer, the cement slurry is stirred/conditioned at analysis temperature and then, at the same temperature, the rheology with the FANN model 35SA viscometer is measured (at high temperature, conditioning is effected at 93° C. and the viscosity is measured). At tem Table 3 shows the water loss-reducing properties of selected abovementioned examples according to API spec. 10 at 35° C. (95° F.) in a static filtration test in the Baroid HTHP filter press. It becomes clear that the water loss reduction with the polymers of the invention can be improved considerably at low temperatures compared to the comparative examples. Of course, at these low temperatures, the polymers based on acryloyldimethyltaurate and acrylamide as claimed in EP-1045869, reworked in comparative example 1, also reduce water loss. However, it becomes clear from table 1 that the water loss of comparative example 1 is nearly twice as high compared to the inventive polymer 4. The gel polymers described in EP-0244981, reworked in comparative examples 2 to 3, show a high water loss even at very low temperatures and are unsuitable for use. For this reason, comparative examples 2 to 3 were not considered in the measurements which follow. The two comparative examples from U.S. Pat. No. 4,015,991, based on partly hydrolyzed poly(acrylamide-co-acryloyldimethyltaurate), reworked in comparative examples 5 and 6, in direct comparison with polymer 4, likewise have nearly twice to three times the water loss. These polymers too appear unsuitable for use.

Formulation of the cement slurries:
100 g of Dyckerhoff Class G
44 g of distilled water
0.3-0.5 g of polymer

TABLE 3

(Use test at 95° F. (35° C.))

| Polymer No. | Concentration % by wt. | Rheology after mixing at 75° F. (24° C.), scale divisions at X revolutions per minute Revolutions per minute (rpm) | | | | | | API fluid loss mL |
|---|---|---|---|---|---|---|---|---|
| | | 600 | 300 | 200 | 100 | 6 | 3 | |
| 2 (P) | 0.5 | 95 | 74 | 46 | 33 | 6 | 3 | 60 |
| 4 (P) | 0.3 | 108 | 77 | 44 | 30 | 5 | 3.5 | 58 |
| 8 (P) | 0.3 | 103 | 73 | 39 | 28 | 4 | 3 | 72 |
| 13 (P) | 0.3 | 90 | 72 | 38 | 25 | 4 | 3 | 75 |
| 16 (P) | 0.3 | 110 | 87 | 53 | 36 | 5 | 3.5 | 95 |
| 18 (P) | 0.3 | 95 | 73 | 45 | 26 | 4 | 3 | 85 |
| 20 (P) | 0.5 | 88 | 67 | 47 | 28 | 4.5 | 3.5 | 66 |
| 28 (P) | 0.3 | 87 | 69 | 39 | 26 | 5 | 3 | 65 |
| 33 (P) | 0.3 | 98 | 82 | 59 | 30 | 6 | 3.5 | 70 |
| 36 (P) | 0.3 | 86 | 63 | 42 | 30 | 5 | 3.5 | 68 |
| 1 (C) | 0.3 | 94 | 68 | 39 | 26 | 5 | 3 | 115 |
| 2 (C) | 0.3 | 290 | 167 | 118 | 67 | 7.5 | 4.5 | 470* |
| 3 (C) | 0.3 | 120 | 105 | 77 | 56 | 11 | 5 | 660* |
| 4 (C) | 0.3 | 275 | 151 | 116 | 59 | 9 | 6.5 | 270* |
| 5 (C) | 0.3 | 168 | 88 | 68 | 38 | 11 | 11.5 | 143* |
| 6 (C) | 0.3 | 225 | 117 | 84 | 43 | 7 | 4.5 | 178* |

(P) = inventive polymer (ex.: 30 (P) = inventive polymer 30 from Table 1a))
(C) = non-inventive comparative example (ex. 5 (C) = comparative example 5)
*values are calculated, since all the water had been expressed before the test had ended.

Table 4 shows the water loss-reducing properties of selected abovementioned examples according to API spec. 10 at 121.1° C. (250° F.) in a stirred filtration test in the Fann HTHP filter press (stirring fluid loss apparatus, SFLA). In order to better show the improved properties of the polymers of the invention compared to the state of the art of the polymers claimed in EP1045869 (comparative example 1), the concentration of the polymers used was varied between 0.25% and 0.5% by weight. It becomes clear that, with the polymers of the invention at lower concentrations (0.25% by peratures of >93° C., the water loss is measured with a stirring fluid loss apparatus (SFLA). weight), water loss is reduced by 40% compared to by weight (80 mL) than with the claimed polymers in EP 1045869 (130 mL).

Formulation of the cement slurries:
100 g of Dyckerhoff Class G Cement
35 g of silica flour
54.8 g of distilled water
Polymer in the concentration specified in table 3 or 4
0.3 g of dispersant (polynaphthalenesulfonate, PNS)
0.5 g of retarder (lignosulfonate)

It was therefore an object of the present invention to provide polymers which can help to achieve improved control of liquid loss in the cement slurries for cementing wellbores at temperatures between 80° F. and 300° F. WO-99/26991 describes copolymers of AMPS and acrylamide. Table 4 on page 23 discloses that there is a distinct decline in the water loss-reducing properties of the polymers described within a temperature range between 100° F. and 200° F., and doubling of the water loss in some cases in the use test. The addition of acrylic acid in the polymers of the invention distinctly improves the water loss compared to the polymers of WO-99/26991. The comparative examples which follow are intended to demonstrate this.

TABLE 4

(Use test at 250° F. (121.1° C.))

| Polymer No. | Concentration % by wt. | Rheology after mixing at 75° F. (24° C.), scale divisions at X revolutions per minute Revolutions per minute (rpm) | | | | | | API fluid loss mL |
|---|---|---|---|---|---|---|---|---|
| | | 600 | 300 | 200 | 100 | 6 | 3 | |
| 1 (C) | 0.25 | 167 | 91 | 63 | 34 | 5 | 3.5 | 130 |
| 1 (C) | 0.5 | >300 | 168 | 117 | 64 | 7.5 | 5.0 | 52 |
| 4 (P) | 0.25 | 170 | 91 | 63 | 34 | 5 | 3.5 | 80 |
| 4 (P) | 0.5 | >300 | 174 | 119 | 65 | 7 | 4.5 | 42 |
| 2 (P) | 0.5 | 295 | 164 | 113 | 62 | 7 | 4.5 | 44 |
| 4 (P) | 0.5 | >300 | 174 | 119 | 65 | 7 | 4.5 | 42 |
| 13 (P) | 0.5 | >300 | 179 | 126 | 70 | 8 | 5 | 40 |
| 7 (P) | 0.5 | >300 | 174 | 123 | 68 | 7 | 4 | 43 |
| 31 (P) | 0.5 | >300 | 167 | 121 | 58 | 7.5 | 3.5 | 54 |
| 26 (P) | 0.5 | 295 | 173 | 119 | 64 | 7 | 4.5 | 60 |

(P) = inventive polymer (ex.: 30 (P) = inventive polymer 30 from Table 1a))

Table 5 shows the water loss-reducing properties of selected abovementioned mixture of starch and the polymers of the invention according to API spec. 10 under various temperature conditions (250° F., 300° F. and 350° F.) in a stirred filtration test in the Fann HTHP filter press (stirring fluid loss apparatus, SFLA).

Formulation of the cement slurries:
100 g of Dyckerhoff Class G Cement
35 g of silica flour
54.8 g of distilled water
Polymer in the concentration specified in table 3 or 4
0.3 g of dispersant (polynaphthalenesulfonate, PNS) 0.5-1.5 g of retarder (lignosulfonate)

Comparative examples according to WO-99/26991:
Comparative Polymer 7: (not in accordance with the invention, prepared according to WO-99/26991—copolymer of acryloyldimethyltaurate 70% by weight and acrylamide 30% by weight)

In a 3 liter Quickfit flask with anchor stirrer, reflux condenser with offgas scrubber, combined thermometer/pH meter and a gas inlet tube, 50 ml of distilled water are added to 1700 g of anhydrous 2-methylpropan-2-ol. The reaction vessel is in a thermostated heating bath.

This reaction vessel is blanketed with nitrogen gas and, in a gentle nitrogen countercurrent, 245 g of acryloyldimethyltaurate are introduced. The acryloyldimethyltaurate does

TABLE 5

(Use tests of the mixtures at different temperatures)

| Polymer No. | Temp. ° F. | Rheology after mixing at 75° F. (24° C.), scale divisions at X revolutions per minute Revolutions per minute (rpm) | | | | | | API fluid loss mL |
|---|---|---|---|---|---|---|---|---|
| | | 600 | 300 | 200 | 100 | 6 | 3 | |
| 2 | 250 | 188 | 104 | 71 | 38 | 5 | 4 | 102 |
| 4 | 250 | 173 | 93 | 63 | 34 | 6 | 5 | 106 |
| 3 | 250 | 208 | 115 | 79 | 43 | 6 | 4.5 | 60 |
| 2 | 300 | 191 | 108 | 74 | 42 | 8.5 | 9 | 52 |
| 4 | 300 | 203 | 113 | 78 | 43 | 7.5 | 6.5 | 46 |
| 3 | 300 | 242 | 133 | 94 | 52 | 9 | 7.5 | 43 |
| 3 | 300 | 228 | 127 | 88 | 49 | 9 | 7.5 | 41 |
| 2 | 350 | 206 | 119 | 91 | 50 | 15 | 14 | 96 |
| 3 | 350 | 217 | 123 | 89 | 54 | 13.5 | 12.5 | 92 |

(P) = inventive polymer (ex.: 30 (P) = inventive polymer 30 from table 1a))

not dissolve completely in the 2-methylpropan-2-ol/water mixture and is partly in the form of a dispersion of solids. The pH of this mixture is below pH 1. Gaseous ammonia is introduced through the gas inlet tube above the liquid phase until the pH of the dispersion is between 7 and 8. On attainment of the desired pH, the mixture is stirred for a further 1 hour and the pH is recorded continuously. The reaction vessel is blanketed with nitrogen, and 105 g of acrylamide are introduced. After the acrylamide has been introduced, the pH is checked again and, if necessary, corrected to the range of pH 7 to 8. A constant nitrogen stream is passed through the solution for at least 1 hour. After this inertization period, the residual oxygen level is checked by means of an oxygen electrode. Should the residual oxygen value in the liquid phase exceed the value of 1 ppm, another inertization is necessary until this value is attained. Thereafter, in a gentle nitrogen stream, 1.5 g of AIBN are added and the reaction vessel is heated to 60° C. Shortly after the attainment of an internal temperature of 60° C., the introduction of nitrogen gas is ended and commencement of the polymerization reaction is observed, which can be identified by an increase in temperature of 10 to 15° C. About 5-15 minutes after onset of the polymerization reaction, the temperature maximum has been exceeded and the temperature in the reaction vessel is increased by the heating bath up to the boiling point of the 2-methylpropan-2-ol/water mixture. Under gentle reflux, the now viscous mass is stirred for a further two hours. The reaction product, in the form of a viscous suspension of polymer in the 2-methylpropan-2-ol/water mixture, is separated off by filtration and subsequent drying in a vacuum drying cabinet.

Yield: 362 g
Dry content (IR drier, 15 minutes at 120° C.): 97.5%
K value (0.5% solution in distilled water): 208

Comparative Polymer 8 (not in accordance with the invention, prepared according to WO-99/26991 copolymer of acryloyldimethyltaurate 60% by weight and acrylamide 40% by weight)

The comparative example is prepared analogously to comparative polymer 7. Rather than the amounts specified in comparative polymer 7, 210 g of acryloyldimethyltaurate and 140 g of acrylamide are used.

Yield: 371 g
Dry content (IR drier, 15 minutes at 120° C.): 95.5%
K value (0.5% solution in distilled water): 219

Comparative Polymer 9 (not in accordance with the invention, prepared according to WO-99/26991 copolymer of acryloyldimethyltaurate 60% by weight and acrylamide 40% by weight)

The comparative example is prepared analogously to comparative polymer 7. Rather than the amounts specified in comparative polymer 7, 280 g of acryloyldimethyltaurate and 70 g of acrylamide are used.

Yield: 363 g
Dry content (IR drier, 15 minutes at 120° C.): 96%
K value (0.5% solution in distilled water): 201

Examples of Test Results

Testing is effected according to API spec. 10. In an atmospheric consistometer, the cement slurry is stirred/conditioned at analysis temperature and then, at the same temperature, the rheology is measured with the FANN model 35SA viscometer (at high temperature, conditioning is effected at 93° C. and the viscosity is measured) and the water loss is measured at below 120° C. with a Baroid HTHP filter press and at above 120° C. with the stirring fluid loss test apparatus. The setting times were determined with an Autoclave Engineers HTHP consistometer. Formulation of the cement slurries: ad 100% Dyckerhoff Class G Cement, 43.7% distilled water, 0.3% polymer.

Table 6 shows the water loss-reducing properties of selected abovementioned examples according to API spec. 10 at 35° C. (95° F.) in a static filtration test in the Baroid HTHP filter press. This makes it clear that it was possible with the polymers of the invention to considerably improve the reduction in water loss at low temperatures compared to the comparative examples. Comparative example 7 differs from comparative example 1 merely by a somewhat smaller amount of initiator (1.5 g rather than 2.0); the measured K value for both polymers mentioned is identical to the value reported in WO-99/26991 and is 212. Both polymers were synthesized by the same method as a precipitation polymer in tert-BuOH.

TABLE 6

API spec. 10 at 35° C. (95° F.) of the polymers of the invention compared to comparative examples 1 and 6 to 8

| Polymer No. | Concentration % by wt. | Rheology after mixing at 75° F. (24° C.), scale divisions at X revolutions per minute Revolutions per minute/rpm | | | | | | API fluid loss mL |
|---|---|---|---|---|---|---|---|---|
| | | 600 | 300 | 200 | 100 | 6 | 3 | |
| 2 (P) | 0.5 | 95 | 74 | 46 | 33 | 6 | 3 | 60 |
| 4 (P) | 0.3 | 108 | 77 | 44 | 30 | 5 | 3.5 | 58 |
| 8 (P) | 0.3 | 103 | 73 | 39 | 28 | 4 | 3 | 72 |
| 13 (P) | 0.3 | 90 | 72 | 38 | 25 | 4 | 3 | 75 |
| 20 (P) | 0.5 | 88 | 67 | 47 | 28 | 4.5 | 3.5 | 66 |
| 28 (P) | 0.3 | 87 | 69 | 39 | 26 | 5 | 3 | 65 |
| 33 (P) | 0.3 | 98 | 82 | 59 | 30 | 6 | 3.5 | 70 |
| 36 (P) | 0.3 | 86 | 63 | 42 | 30 | 5 | 3.5 | 68 |
| 1 (C) | 0.3 | 94 | 68 | 39 | 26 | 5 | 3 | 115 |
| 7 (C) | 0.3 | 96 | 72 | 41 | 26 | 4.5 | 3.5 | 109 |
| 8 (C) | 0.3 | 113 | 81 | 47 | 29 | 6 | 3 | 121 |
| 9 (C) | 0.3 | 87 | 75 | 54 | 33 | 6 | 4 | 116 |

(P) = polymer
(C) = comparative example

TABLE 7

API spec. 10 at 250° F. (121.1° C.) of the polymers of the invention compared to comparative examples 1 and 6 to 8

| Polymer No. | Concentration % by wt. | Rheology after mixing at 75° F. (24° C.), scale divisions at X revolutions per minute Revolutions per minute/rpm | | | | | | API fluid loss mL |
|---|---|---|---|---|---|---|---|---|
| | | 600 | 300 | 200 | 100 | 6 | 3 | |
| 4 (P) | 0.5 | >300 | 174 | 119 | 65 | 7 | 4.5 | 42 |
| 2 (P) | 0.5 | 295 | 164 | 113 | 62 | 7 | 4.5 | 44 |
| 13 (P) | 0.5 | >300 | 179 | 126 | 70 | 8 | 5 | 40 |
| 7 (P) | 0.5 | >300 | 174 | 123 | 68 | 7 | 4 | 43 |
| 31 (P) | 0.5 | >300 | 167 | 121 | 58 | 7.5 | 3.5 | 54 |
| 1 (C) | 0.5 | >300 | 168 | 117 | 64 | 7.5 | 5.0 | 52 |
| 7 (C) | 0.5 | >300 | 175 | 113 | 67 | 7 | 5 | 54 |
| 8 (C) | 0.5 | >300 | 187 | 129 | 72 | 8 | 6 | 60 |
| 9 (C) | 0.5 | >300 | 159 | 110 | 63 | 7 | 4.5 | 58 |

(P) = polymer
(C) = comparative example

In table 6, it was possible to detect an improvement in the water loss-reducing properties at 95° F. The water loss-reducing properties of comparative example 7 by direct comparison with comparative example 1 show nearly identical values and demonstrate the reproducibility of the process used. Nevertheless, the water loss of comparative polymers 1 and 6 to 9 at an average of 115 mL+/−5 mL is distinctly higher than that of the polymers of the invention. The difference in the water loss of the polymers of the invention relative to the comparative polymers was between 30 and 55 mL. This demonstrates clearly that the addition of acrylic acid leads to a technical improvement at low temperatures.

Table 7 shows the water loss-reducing properties of selected abovementioned examples according to API spec. 10 at 250° F. (121.1° C.) in a static filtration test in the Baroid HTHP filter press. In this test too, it was possible to show that the polymers of the invention have a demonstrably lower water loss at temperatures between 80° F. and 300° F. and under identical experimental conditions than the polymers of WO-99/26991. Running the comparison between comparative example 7 of WO-99/26991 and comparative example 1 (according to EP 1045869) again, the good reproducibility of the process used is shown in this test as well. The use tests conducted according to API spec. 10 at 95° F. and 250° F. demonstrate clearly that addition of acrylic acid to the polymers of the invention leads to an improvement in the water loss-reducing properties.

The invention claimed is:

1. A method for cementing deep wells using a cement slurry, wherein the cement slurry comprises a water-soluble or water-swellable polymer having a k value of 100 to 300, measured in 0.5% by weight solution in distilled water, containing
  a) 25-35 mol % of one or more recurrent structural units derived from monomers selected from the group consisting of acryloyldimethyltaurate, acryloyl-1,1-dimethyl-2-methyltaurate, acryloyltaurate, and acryloyl-N-methyltaurate,
  b) 3 to 8 mol % of one or more recurrent structural units of the formula (2)

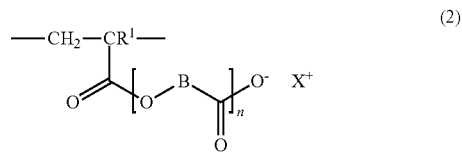

in which
  $R^1$ is hydrogen, methyl or ethyl,
  $X^+$ is $H^+$, $NH_4^+$, $Li^+$, $Na^+$, $K^+$, ½ $Ca^{++}$, ½ $Mg^{++}$, ½ $Zn^{++}$, ⅓ $Al^{+++}$, organic ammonium ions of the formula $[HNR^5R^6R^7]^+$ where $R^5$, $R^6$ and $R^7$ may each independently be hydrogen, a linear or branched alkyl group having 1 to 22 carbon atoms, a linear or branched, mono- or polyunsaturated alkenyl group having 2 to 22 carbon atoms, a $C_6$-$C_{22}$-alkylamidopropyl group, a linear monohydroxyalkyl group having 2 to 10 carbon atoms or a linear or branched dihydroxyalkyl group having 3 to 10 carbon atoms, and where at least one of the $R^5$, $R^6$ and $R^7$ radicals is not hydrogen, or mixtures of these ions,
  B is a chemical bond, or a linear or branched alkylene group having 1 to 6 carbon atoms, and
  n is an integer from 0 to 5,
and
  c) 57 to 72 mol % of one or more recurrent structural units of the formula (3)

$$—CH_2—CR^1—$$
$$\underset{O}{\overset{}{|}}\!\!\!-\!\!C(=O)-N(R^3)(R^4)$$

in which
  $R^1$ is hydrogen, methyl or ethyl, and
  $R^3$ and $R^4$ are each independently hydrogen, methyl, ethyl, n-propyl, isopropyl or butyl.

2. The method as claimed in claim 1, wherein the structural units of the formula (2) are derived from methacrylic acid, acrylic acid, carboxyethyl acrylate or higher oligomers of the formula (2) in which n is an integer of 2 or more.

3. The method as claimed in claim 1, wherein the structural units of the formula (3) are derived from acrylamide, N-methylacrylamide, N-ethylacrylamide, N, N-diethylmethacrylamide, N, N-diethylacrylamide, N, N-dimethylmethacrylamide, N,N-dimethylacrylamide, N-isopropylacrylamide, N-tert-butylacrylamide and N-butylacrylamide.

4. The method as claimed in claim 1, wherein $X^+$ in formula (2) is selected from the group consisting of $H^+$, $NH_4^+$, $Na^+$ and combinations of these ions.

5. The method as claimed in claim 1 wherein the water-soluble or water-swellable polymer contains
   a) 27.5 to 32.5 mol % of one or more recurrent structural units derived from acryloyldimethyltaurate,
   b) 4.5 to 7.5 mol % of one or more structural units of the formula (2) selected from the group consisting of structural units derived from acrylic acid, and
   c) 60 to 68 mol % of one or more structural units of the formula (3) selected from the group consisting of structural units derived from acrylamide.

6. The method as claimed in claim 1, in which the neutralization level of the structural units a) is 95 to 100 mol %.

7. The method as claimed in claim 1, in which n=0 in at least 70% of all the structural units of the formula (2).

8. The method as claimed in claim 1, in which n is 0 or 1.

9. The method as claimed in claim 1, in which formula (3) is derived from acrylamide.

10. The method as claimed in claim 1, wherein the water-soluble or water-swellable polymer contains 27.5 to 32.5 mol % of the structural units a), 4.5 to 7.5 mol % of the structural units of the formula (2) and 60 to 68 mol % of the structural units of the formula (3).

11. The method as claimed in claim 1, in which structural unit a) is derived from acryloyldimethyltaurate, formula (2) represents one or more structural unit derived from acrylic acid and formula (3) represents one or more structural unit derived from acrylamide.

12. The method as claimed in claim 1, wherein the polymer is prepared by subjecting monomers from which the structural units of components a) to c) derive to free-radical precipitation polymerization in a polar solvent, and the monomers are optionally neutralized prior to the polymerization, or the polymer is optionally neutralized after the polymerization, with ammonia, ammonium carbonate or organic amines or an $Li^+$-, $Na^+$-, $K^+$-, $Ca^{++}$-, $Mg^{++}$-, $Zn^{++}$- or $Al^{+++}$-containing base.

13. The method as claimed in claim 12, wherein the polar solvent has a boiling point of 60 to 110° C.

14. The method as claimed in claim 12, wherein the polar solvent is a solvent mixture of
   d) water
   and
   e) one or more further polar solvents.

15. The method as claimed in claim 12, wherein the polar solvent comprises methanol, ethanol, 1-propanol, 2-propanol, 2-methyl-2-propanol, 1-butanol, 2-butanol, dimethyl ketone, diethyl ketone, pentan-2-one, butanone, tetrahydropyran, tetrahydrofuran, 2-m ethyltetrahydrofuran, 1,3-dioxane or 1,4-dioxane.

16. The method as claimed in claim 12, in which the polar solvent comprises 2-methylpropan-2-ol.

17. The method as claimed in claim 12, wherein the polar solvent comprises 1% to 5% by weight of water.

18. The method as claimed in claim 12, wherein 27.5 to 32.5 mol % of acryloyldimethyltaurate, and 4.5 to 7.5 mol % of acrylic acid, 60 to 68 mol % of acrylamide is subjected to free-radical precipitation polymerization in a mixture of 1% to 8% by weight of water and 92% to 99% by weight of 2-methylpropan-2-ol, and the monomers prior to the polymerization or the polymer after the polymerization are/is optionally neutralized with ammonia, ammonium carbonate, sodium hydroxide, or sodium carbonate.

* * * * *